(12) United States Patent
Kusumura et al.

(10) Patent No.: US 9,824,142 B2
(45) Date of Patent: Nov. 21, 2017

(54) INFORMATION PROCESSING DEVICE, INFORMATION PROCESSING METHOD, AND COMPUTER-READABLE RECORDING MEDIUM

(75) Inventors: Yukitaka Kusumura, Tokyo (JP); Hironori Mizuguchi, Tokyo (JP); Dai Kusui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 13/522,278

(22) PCT Filed: Dec. 21, 2010

(86) PCT No.: PCT/JP2010/072946
§ 371 (c)(1),
(2), (4) Date: Jul. 13, 2012

(87) PCT Pub. No.: WO2011/086820
PCT Pub. Date: Jul. 21, 2011

(65) Prior Publication Data
US 2012/0303611 A1    Nov. 29, 2012

(30) Foreign Application Priority Data
Jan. 15, 2010  (JP) .................................... 2010-7339

(51) Int. Cl.
  *G06F 17/30*  (2006.01)
  *G06F 7/00*   (2006.01)
(52) U.S. Cl.
  CPC ............................... *G06F 17/3071* (2013.01)
(58) Field of Classification Search
  None
  See application file for complete search history.

(56) References Cited

U.S. PATENT DOCUMENTS 6,278,997 B1 *  8/2001 Agrawal ........... G06F 17/30539
6,442,545 B1 *  8/2002 Feldman et al.
(Continued)

FOREIGN PATENT DOCUMENTS

JP    2000-222431 A    8/2000
JP    2005-208838 A    8/2005
(Continued)

OTHER PUBLICATIONS

Wisam Dakka, et al., "Automatic Construction of Multifaced Browsing Interfaces", Proc. of CIKM '05, ACM, Oct. 2005, pp. 768-775.
(Continued)

*Primary Examiner* — Taelor Kim
*Assistant Examiner* — David T Brooks
(74) *Attorney, Agent, or Firm* — Sughrue Mion, PLLC

(57) ABSTRACT

The information processing device 1 processes document collections having tags permitting semantic class identification appended to each document and comprises a search unit 2, which creates multiple semantic class units containing one, two, or more semantic classes based on a taxonomy that identifies relationships between semantic classes, and a frequency calculation unit 3 which, for each of the semantic class units, identifies documents that match that semantic class unit in the document collections and, for these matching documents, calculates a first frequency that represents the frequency of occurrence in a designated document collection and a second frequency that represents the frequency of occurrence in non-designated document collections. Once the calculations have been performed, the search unit 2 identifies any of the semantic class units based on the first frequency and the second frequency of the matching documents.

19 Claims, 22 Drawing Sheets

(56) References Cited

U.S. PATENT DOCUMENTS

| | | | |
|---|---|---|---|
| 7,472,121 B2* | 12/2008 | Kothari et al. | |
| 7,890,514 B1* | 2/2011 | Mohan et al. | 707/748 |
| 7,996,393 B1* | 8/2011 | Nanno | G06F 17/30707 |
| | | | 707/723 |
| 2002/0173971 A1* | 11/2002 | Stirpe | G06F 17/30867 |
| | | | 705/14.53 |
| 2004/0019601 A1* | 1/2004 | Gates | G06F 17/3071 |
| 2004/0024739 A1* | 2/2004 | Copperman | G06F 17/30616 |
| 2006/0015486 A1* | 1/2006 | Nomiyama et al. | 707/3 |
| 2006/0242147 A1* | 10/2006 | Gehrking | G06F 17/30707 |
| 2007/0083492 A1* | 4/2007 | Hohimer | G06N 5/02 |
| 2008/0104060 A1* | 5/2008 | Abhyankar | G06F 17/30643 |
| 2008/0177736 A1* | 7/2008 | Spangler | G06F 17/3071 |
| 2008/0319941 A1* | 12/2008 | Gollapudi | G06F 17/30616 |
| 2009/0024965 A1* | 1/2009 | Zhdankin | G06F 17/2785 |
| | | | 715/863 |
| 2009/0125505 A1* | 5/2009 | Bhalotia | G06F 17/30707 |
| 2010/0030552 A1* | 2/2010 | Chen | G06F 17/30734 |
| | | | 704/9 |
| 2010/0179956 A1* | 7/2010 | Jammalamadaka | G06F 17/30389 |
| | | | 707/748 |
| 2010/0332478 A1* | 12/2010 | Duman | G06F 17/241 |
| | | | 707/738 |
| 2011/0125791 A1* | 5/2011 | Konig | G06F 17/30864 |
| | | | 707/770 |

FOREIGN PATENT DOCUMENTS

| | | |
|---|---|---|
| JP | 2008-203933 A | 9/2008 |
| JP | 2009-151390 A | 7/2009 |
| JP | 2009-251825 A | 10/2009 |

OTHER PUBLICATIONS

Ramakrishnan Srikant, et al., "Mining Generalized Association Rules", Proc. of VLDB, 1995, pp. 407-419.

Kritsada Sriphaew, et al., "A New Method for Finding Generalized Frequent Itemsets in Generalized Association Rule Mining", Proc. of ISCC, 2002, pp. 22-27.

* cited by examiner

FIG. 2

| Document IDs | Body Text |
|---|---|
| 001 | Company A, a major electric appliance manufacturer, announces a net profit of 10 Billion Yen in its March 2008 financial results. |
| 002 | Company B, a food manufacturer, announces a net profit of 20 Billion Yen in its financial results for March 2009. |

FIG. 3

| Document IDs | Examples of Tags |
|---|---|
| 001 | C005, C011, C013 |
| 002 | C006, C011, C013 |

FIG. 13

| Parent nodes node | Child nodes cNode | Depth d | Designated document collection frequency cNode.a |
|---|---|---|---|
| $\phi$ (phi) | V | 1 | 0.9 |
| $\phi$ (phi) | W | 1 | 0.8 |
| V | U | 2 | 0.8 |
| ... | ... | ... | ... |

FIG. 15

| Child nodes (cNode) | Semantic Class Units | Designated document collection frequency a | Non-designated document collection frequency b |
|---|---|---|---|
| B | B | 0.6 | 0.4 |
| BC | B, C | 0.6 | 0.4 |
| BW | B, W | 0.55 | 0.3 |
| UW | U, W | 0.8 | 0.3 |
| UE | U, E | 0.7 | 0.1 |

FIG. 20

| Document | Enterprise | Net Profit | Month/Year |
|---|---|---|---|
| 001 | Company A. | 10 billion | March 2008 |
| 002 | Company B. | 20 billion | March 2009 |

FIG. 21

| Document | Electric Appliance Manufacturer | Food Manufacturer | Enterprise | Personal Name | Net Profit | ... |
|---|---|---|---|---|---|---|
| 001 | 1 | 0 | 1 | 0 | 1 | ... |
| 002 | 0 | 1 | 1 | 0 | 1 | ... |
| 003 | 0 | 1 | 1 | 0 | 1 | ... |
| 004 | 0 | 0 | 0 | 1 | 0 | ... |
| 005 | 1 | 0 | 1 | 0 | 1 | ... |
| 006 | 0 | 0 | 0 | 1 | 0 | ... |
| 007 | 0 | 0 | 0 | 1 | 1 | ... |
| 008 | 0 | 0 | 0 | 1 | 1 | ... |

INFORMATION PROCESSING DEVICE, INFORMATION PROCESSING METHOD, AND COMPUTER-READABLE RECORDING MEDIUM

CROSS REFERENCE TO RELATED APPLICATIONS

This application is a National Stage of International Application No. PCT/JP2010/072946 filed Dec. 21, 2010, claiming priority based on Japanese Patent Application No. 2010-007339, filed Jan. 15, 2010, the contents of all of which are incorporated herein by reference in their entirety.

TECHNICAL FIELD

The present invention relates to an information processing device and an information processing method that make use of text and taxonomies to carry out a process of identification of semantic classes used for summarizing collections of retrieved text, as well as to a computer-readable recording medium having recorded thereon a software program used to implement the same.

BACKGROUND ART

A description of a traditional text retrieval and summarization system containing a taxonomy and tagged text is provided below. First of all, the definitions of "taxonomy", "tagged text", and "text retrieval and summarization system" will be given.

A taxonomy is a directed acyclic graph (DAG: Directed Acyclic Graph) comprising multiple semantic classes. Each semantic class is composed of a label and a class identifier and, in addition, has parent-child relationships with other semantic classes. A parent class is a semantic class serving as a superordinate concept relative to a certain semantic class. A child class is a semantic class serving as a subordinate concept relative to a certain semantic class. A label is a character string that represents its semantic class. It should be noted that in the discussion below a semantic class labeled 'X' may be represented as "X-Class".

A class identifier is a unique value indicating a specific semantic class within a taxonomy. Here, an example of a taxonomy will be described with reference to FIG. 18. FIG. 18 illustrates an exemplary taxonomy. In the example of FIG. 18, thirteen semantic classes are represented by ovals, with the labels of the semantic classes noted inside the ovals and, furthermore, class identifiers noted next to the ovals. In addition, in FIG. 18, the arrows denote parent-child relationships between the semantic classes. For example, the class "electric appliance manufacturer" has "C002" as a class identifier, the class "enterprise" as a parent class, and the class "Company A" as a child class. It should be noted that in the description that follows, semantic classes that are at the lowermost level within the taxonomy and don't have a child class are referred to as "leaf classes".

A tagged text is information that includes at least a body text composed of character strings and a set of tags attached in arbitrary locations within the character strings. It should be noted that in the description below, a tagged text may be described simply as a "document". FIG. 19 illustrates an exemplary tagged text. FIG. 19 shows an example of two tagged texts, i.e. Document 001 and Document 002. Of the above, Document 001 is composed of body text, i.e. "Company A, a major electric appliance manufacturer, announces a net profit of 10 Billion Yen in its March 2008 financial results", and tags "Company A", "March 2008", and "10 Billion Yen" attached in three places.

Each one of the tags in the documents contains three information items, namely, a class pointer, a start position, and an end position. A class pointer is a class identifier indicating a leaf class within the taxonomy. The start position and end position constitute information representing the location where the tag is attached. For example, the start position and end position are typically represented by the number of characters from the beginning of the sentence when the beginning of the sentence is "0". For example, the start position of the tag attached to "Company A" is the location of the $9^{th}$ character, and its end position is the $11^{th}$ character from the beginning of the sentence.

A text retrieval and summarization system is a system that uses search terms represented by keywords and the like to assemble a collection of tagged text associated with the search terms and summarizes the search results based on the tags contained in the collection of tagged text.

An example, in which a traditional text retrieval and summarization system generates a type of summary called tabular summary, will be described next. For example, let us assume that a user has entered a query ""financial results" AND "announces"". At such time, first of all, the text retrieval and summarization system collects tagged text containing the two expressions, i.e. "financial results" and "announces", in the body text. Here, it is assumed that Document 001 and Document 002 illustrated in FIG. 19 have been assembled into a collection of matching documents. It should be noted that, as used herein, collections of tagged text that match user-entered queries are referred to as "matching document collections". On the other hand, collections of tagged text that do not match user-entered queries are referred to as "non-matching document collections".

Next, based on the tags attached to the collected tagged text, the text retrieval and summarization system selects multiple semantic classes as a point of view for summarization. For example, let us assume that the text retrieval and summarization system has selected "enterprise", "net profit", and "Month/Year". At such time, the text retrieval and summarization system generates the results illustrated in FIG. 20. FIG. 20 shows an example of output from a traditional text retrieval and summarization system. In the example of FIG. 20, a table having rows assigned respectively to Document 001 and Document 002 is created based on the character strings of the tagged portions of Document 001 and Document 002.

In this manner, the text retrieval and summarization system selects several semantic classes from a collection of tagged text obtained based on the search terms and summarizes the search results from the point of view represented by the selected semantic classes.

In order to build such a text retrieval and summarization system, it is necessary to decide what set of semantic classes to retrieve as a point of view from the collection of tagged texts selected based on the search terms. In other words, the problem is to determine the criteria to be used in identifying the semantic classes specific to a collection of user-selected texts. In this Specification, this problem is treated as the problem of semantic class identification.

For example, in connection with the problem of semantic class identification, Non-Patent Document 1 has disclosed a system of facet identification in multi-faceted search. The term "multi-faceted search" refers to a technology, in which tag information called "facets" is appended to data based on various points of view (time, place name, enterprise name, etc.) and only specific data is retrieved when the user specifies the terms for the facets. The system of facet identification disclosed in Non-Patent Document 1 ranks facets based on several evaluation scores in a data set obtained via a user search and selects the data, to which the top K facets are appended.

It is believed that using this facet identification system disclosed in Non-Patent Document 1 can solve the above-described semantic class identification problem. For example, it is contemplated to rank semantic classes attached to texts extracted as search results based on certain evaluation scores in accordance with the facet identification system and retrieve the top K semantic classes with high evaluation scores as a point of view.

However, when the facet identification system disclosed in Non-Patent Document 1 is used, the number K of the semantic classes retrieved as a point of view needs to be specified by the user and, in addition, semantic classes are assessed on an individual basis only, and assessment of combinations of multiple semantic classes is not performed. Accordingly, when the facet identification system disclosed in Non-Patent Document 1 is used, there is a chance that unsuitable combinations of semantic classes may be retrieved. This will be illustrated with reference to FIG. 21 using an exemplary situation where the frequencies obtained in search results are utilized as evaluation scores for individual semantic classes.

FIG. 21 is a diagram illustrating an exemplary situation, in which tagged texts are categorized using tags. The distribution of the tags in the search results is as shown in FIG. 21. In FIG. 21, each row designates a tagged text in the search results. In addition, the columns, except for the first column of FIG. 21, designate semantic classes. Furthermore, the cells of FIG. 21 mean whether or not the semantic classes are included in each tagged text. In each cell of FIG. 21, "1" is listed when a semantic class is included and "0" is listed when a semantic class is not included.

In the example of FIG. 21, individual semantic classes with high frequencies include "net profit", "enterprise", and "name". However, among these, "name" rarely appears in conjunction with other semantic classes, and retrieving these 3 classes as a point of view would not be efficient. Thus, when semantic classes are assessed on an individual basis, there is a chance that undesirable semantic classes may be retrieved depending on the semantic class combinations.

In addition, Non-Patent Document 2 and Non-Patent Document 3 have disclosed generalized association rule mining as a method for semantic class combination assessment. Generalized association rule mining is a technique, in which a taxonomy and a record set are accepted as input, a set of nodes in the taxonomy that are frequently encountered in the record set is selected, and a set of semantic classes with a high correlation between the semantic classes is outputted in the "if X, then Y" format. It should be noted generalized association rule mining is computationally intensive because assessment is performed for every contemplated combination of semantic classes. For this reason, in generalized association rule mining, enumeration trees are created in order to efficiently enumerate the combinations.

Therefore, it is believed that using generalized association rule mining, as disclosed in Non-Patent Document 2 and Non-Patent Document 3, in the facet identification system disclosed in Non-Patent Document 1 will make it possible to determine whether a combination of semantic classes is undesirable.

CITATION LIST

Non-Patent Documents

Non-Patent Document 1:
Wisam Dakka, Panagiotis G. Ipeirotis, Kenneth R. Wood, "Automatic Construction of Multifaceted Browsing Interfaces", Proc. of CIKM '05, pp. 768-775, 2005.
Non-Patent Document 2:
Ramakrishnan Srikant and Rakesh Agrawal, "Mining Generalized Association Rules", Proc of VLDB, pp. 407-419, 1995.
Non-Patent Document 3:
Kritsada Sriphaew and Thanaruk Theeramunkong, "A New Method for Finding Generalized Frequent Itemsets in Generalized Association Rule Mining", Proc. of ISCC, pp. 1040-1045, 2002.

DISCLOSURE OF THE INVENTION

Problem to be Solved by the Invention

However, generalized association rule mining, as disclosed in Non-Patent Document 2 and Non-Patent Document 3, is used for devising rules based on combinations of highly correlated semantic classes within record sets and is not used for selecting combinations of semantic classes from the standpoint of summarizing search results. Therefore, it is still extremely difficult to find a solution to the semantic class identification problem even if the above-described Non-Patent Document 1-Non-Patent Document 3 were combined. For this reason, a technology is required for assessing combinations of semantic classes and identifying semantic classes specific to user-selected document collections, in other words, semantic classes suitable for summarizing search results.

It is an object of the present invention to eliminate the above-described problems and provide an information processing device, an information processing method, and a computer-readable recording medium that can be used to assess combinations of semantic classes contained in document collections and identify one, two, or more semantic classes specific to designated document collections.

Means for Solving the Problem

In order to attain the above-described object, the information processing device of the present invention, which is an information processing device that processes document collections having tags permitting semantic class identification appended to each document, includes:

a search unit that creates multiple semantic class units containing one, two, or more semantic classes based on a taxonomy that identifies relationships between semantic classes among multiple semantic classes; and a frequency calculation unit that for each of the semantic class units, identifies documents that match that semantic class unit in the document collections and, for the identified matching documents, calculates a first frequency that represents the frequency of occurrence in a designated document collection among the document collections and a second frequency that represents the frequency of occurrence in non-designated document collections among the document collections, and once the calculations have been performed by the frequency calculation unit, the search unit identifies any of the semantic class units based on the first frequency and the second frequency of the matching documents.

Further, in order to attain the above-described object, the information processing method of the present invention, which is an information processing method for processing document collections having tags permitting semantic class identification appended to each document, includes the steps of:

(a) creating multiple semantic class units containing one, two, or more semantic classes based on a taxonomy that identifies relationships between semantic classes among multiple semantic classes;

(b) for each of the semantic class units, identifying documents matching that semantic class unit in the document collections;

(c) for the matching documents identified in Step (b), calculating, for each of the semantic class units, a first frequency that represents the frequency of occurrence in a designated document collection among the document collections and a second frequency that represents the frequency of occurrence in non-designated document collections among the document collections; and (d) once the calculations of Step (c) above have been performed, identifying any of the semantic class units based on the first frequency and the second frequency of the matching documents identified in Step (b) above.

Furthermore, in order to attain the above-described object, the computer-readable recording medium of the present invention is a computer-readable recording medium having recorded thereon a software program used to carry out information processing on document collections having tags permitting semantic class identification appended to each document, the software program including instructions directing a computer to carry out the steps of:

(a) creating multiple semantic class units containing one, two, or more semantic classes based on a taxonomy that identifies relationships between semantic classes among multiple semantic classes;

(b) for each of the semantic class units, identifying documents matching that semantic class unit in the document collections;

(c) for the matching documents identified in Step (b), calculating, for each of the semantic class units, a first frequency that represents the frequency of occurrence in a designated document collection among the document collections and a second frequency that represents the frequency of occurrence in non-designated document collections among the document collections; and (d) once the calculations of Step (c) above have been performed, identifying any of the semantic class units based on the first frequency and the second frequency of the matching documents identified in Step (b) above.

Effects of the Invention

The foregoing characteristics of the information processing device, information processing method, and computer-readable recording medium of the present invention make it possible to assess combinations of semantic classes contained in document collections and identify one, two, or more semantic classes specific to a designated document collection.

BRIEF DESCRIPTION OF THE DRAWINGS

FIG. 2 is a diagram illustrating an example of the data stored in the body text storage unit in Embodiment 1 of the present invention.

FIG. 3 is a diagram illustrating an example of the data stored in the tag storage unit in Embodiment 1 of the present invention.

FIG. 13 is a diagram illustrating the nodes of an enumeration tree obtained by the top-down search process shown in FIG. 12.

FIG. 15 is a diagram illustrating an example of the semantic class units identified in Working Example 1.

FIG. 20 shows an example of output from a traditional text retrieval and summarization system.

FIG. 21 is a diagram illustrating an exemplary situation, in which tagged texts are categorized using tags.

DESCRIPTION OF EMBODIMENTS

Embodiment 1

Figure 1:
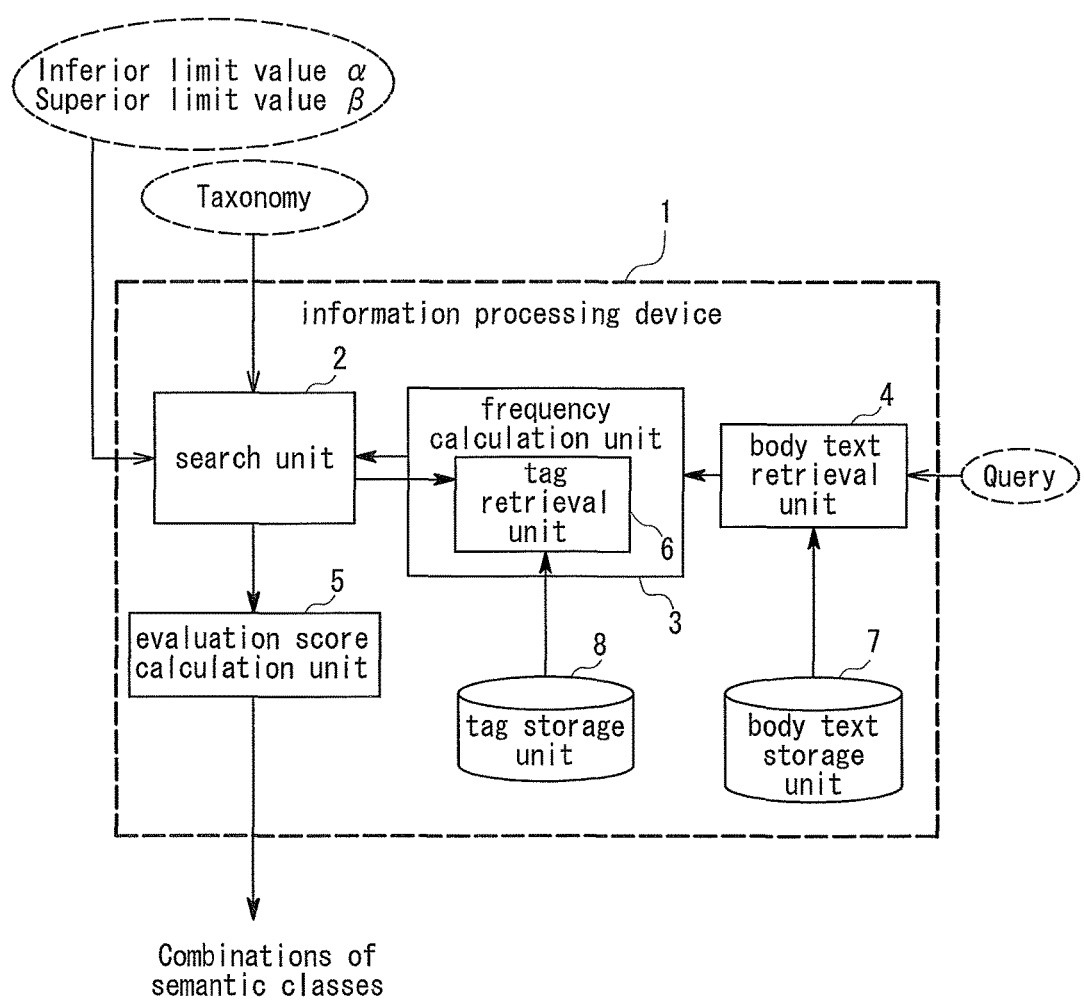
FIG. 1 is a block diagram illustrating the configuration of the information processing device used in Embodiment 1 of the present invention.

The information processing device, information processing method, and software program used in Embodiment 1 of the present invention will now be described with reference to FIG. 1-FIG. 7. First of all, the configuration of the information processing device 1 used in Embodiment 1 will be described with reference to FIG. 1. FIG. 1 is a block diagram illustrating the configuration of the information processing device used in Embodiment 1 of the present invention.

The information processing device 1 illustrated in FIG. 1 is an apparatus that carries out information processing on document collections. One, two or more tags permitting semantic class identification are appended to each document constituting a document collection. In addition, in the following discussion, documents having tags appended thereto will be referred to as "tagged documents". The semantic classes are classes used for categorization. In Embodiment 1, as explained in the Background Art section with reference to FIG. 18, the semantic class has a label and a class identifier (class pointer). Furthermore, as explained in the Background Art section with reference to FIG. 19, the tags have a class identifier for the corresponding semantic class, a start position of the tag, and an end position of the tag.

Further, as shown in FIG. 1, the information processing device 1 includes a search unit 2 and a frequency calculation unit 3. The search unit 2 creates multiple semantic class units including the one, two, or more semantic classes based on a taxonomy that identifies relationships between semantic classes among multiple semantic classes. Specifically, a semantic class unit is a semantic class itself or a combination of semantic classes (a set of semantic classes). In addition, for each semantic class unit created by the search unit 2, the frequency calculation unit 3 identifies documents (referred to as "matching documents" below) that match that semantic class unit in document collections made up of tagged documents.

Furthermore, for each semantic class unit, the frequency calculation unit 3 calculates the frequency of occurrence of the identified matching documents in a designated document collection among the document collections (referred to as the "designated document collection" below) and the frequency of occurrence in non-designated document collections among the document collections. It should be noted that in the discussion below, the frequency of occurrence in the designated document collection is referred to as the "designated document collection frequency a" and the frequency of occurrence in the non-designated document collections is referred to as the "non-designated document collection frequency b".

In addition, once the calculations have been performed by the frequency calculation unit 3, the search unit 2 identifies semantic class units, for which the designated document collection frequencies a of the matching documents are higher than a threshold value (inferior limit value $\alpha$) and, at the same time, the non-designated document collection frequencies b of the matching documents are lower than a threshold value (superior limit value $\beta$).

Thus, for each contemplated semantic class unit, the information processing device 1 identifies the number of times the matching documents have occurred in the designated document collection (i.e., the designated document collection frequency a) and the number of times the matching documents have occurred in document collections other than the designated one (i.e., the non-designated document collection frequency b). Accordingly, by comparing the number of times the matching documents have occurred in the designated document collection and the number of times they have occurred in document collections other than the designated document collection, the information processing device 1 can identify the matching documents, for which only the number of times they have occurred in the designated document collection is higher.

The semantic class units, i.e. the semantic classes or semantic class combinations, that are specific to the designated document collection are identified as a result. The information processing device 1 can perform assessment of semantic classes contained in document collections in a combined state and can identify one, two, or more semantic classes specific to a designated document collection (for example, a user-selected document collection).

The configuration of the information processing device 1 will now be described more specifically with reference to FIG. 2 and FIG. 3 in addition to FIG. 1. FIG. 2 is a diagram illustrating an example of the data stored in the body text storage unit in Embodiment 1 of the present invention. FIG. 3 is a diagram illustrating exemplary data stored in the tag storage unit in Embodiment 1 of the present invention.

As shown in FIG. 1, in Embodiment 1, in addition to the search unit 2 and the frequency calculation unit 3, the information processing device 1 is further provided with a body text retrieval unit 4, an evaluation score calculation unit 5, a body text storage unit 7, and a tag storage unit 8. It should be noted that although the body text storage unit 7 and tag storage unit 8 are provided in the information processing device 1 in the example of FIG. 1, the invention is not limited to this example, and they may be provided in another apparatus connected to the information processing device 1 over a network etc.

As shown in FIG. 2, the body text storage unit 7 stores the body text of the tagged documents constituting the target document collection in association with identifiers (referred to as "document IDs" below). In addition, as shown in FIG. 2, document IDs are identifiers attached to the each tagged document. Body text is a character string in a given natural language.

As shown in FIG. 3, the tag storage unit 8 stores tag strings in association with the document IDs of the tagged documents. As shown in FIG. 3, the document IDs are the same IDs as the document IDs stored in the body text storage unit 7. The data stored in the body text storage unit 7 is associated with the data stored in the tag storage unit 8 through the document IDs. In addition, the tag strings, which are a set of class pointers indicating a set of semantic classes, are acquired by extracting only the class pointers (class identifiers) from all the tags appended to the corresponding tagged documents (see FIG. 19).

The body text retrieval unit 4, which is invoked by external input of search terms (query), carries out retrieval based on the search terms from a document collection of tagged documents stored in the body text storage unit 7. In Embodiment 1, the search terms are entered using user-operated input devices such as keyboards, other software running on the information processing device 1, or external devices connected to the information processing device 1 through a network and the like. Keyword strings including one, two or more keywords are suggested as a specific example of the search terms.

In addition, the body text retrieval unit 4 outputs the document collection identified by the search to the frequency calculation unit 3. The frequency calculation unit 3 then uses this document collection identified by the search as the designated document collection to calculate the designated document collection frequencies a and the non-designated document collection frequencies b.

Specifically, the body text retrieval unit 4 refers to the body text storage unit 7, identifies one, two or more tagged documents, all of which contain the keyword strings constituting the search terms in their body text, and creates a list of the document IDs of the identified tagged documents. This list of document IDs (referred to as the "query document list" below) is information representing the document collection identified by the search, and the body text retrieval unit 4 outputs this query document list to the frequency calculation unit 3. In addition, in Embodiment 1, the body text retrieval unit 4 can be built using a regular document search engine.

In Embodiment 1, the search unit 2 operates by accepting as input a taxonomy, an inferior limit value α used for the designated document collection frequencies a, and a superior limit value β used for the non-designated document collection frequencies b. In addition, as described above, the search unit 2 possesses functionality to create semantic class units and functionality to identify semantic class units using the designated document collection frequencies a and the non-designated document collection frequencies b. It should be noted that, in the description that follows, in accordance with the process time line in the information processing device 1, the semantic class unit creation functionality of the search unit 2 will be described first, and a description of the specific functionality of the frequency calculation unit 3 will be given thereafter. The semantic class unit identification functionality of the search unit 2 will be described after the description of the frequency calculation unit 3.

Figure 18:
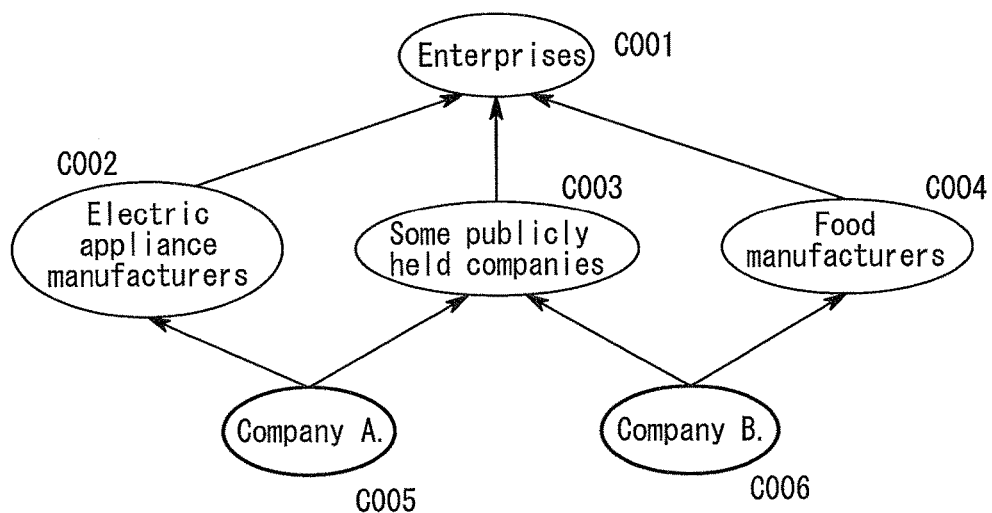
FIG. 18 illustrates an exemplary taxonomy.
Figure 18:
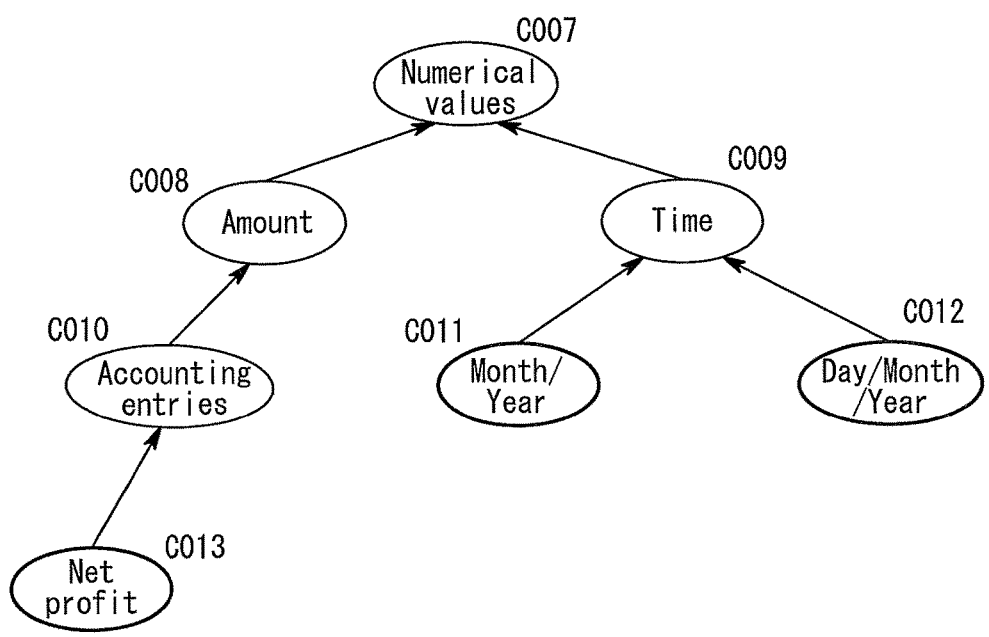

In Embodiment 1, the data illustrated in FIG. 18 in the Background Art section can be used as a taxonomy. A taxonomy identifies relationships between semantic classes among multiple semantic classes in a hierarchical manner. In addition, a taxonomy is prepared in advance by the administrator of the information processing device 1, other software programs running on the information processing device 1, or external devices connected to the information processing device 1 through a network and the like.

The search unit 2 checks the semantic classes in the taxonomy (see FIG. 6 described below) in a top-down manner and enumerates semantic class units. Specifically, as the search unit 2 traverses the taxonomy from the top level to the bottom level, it creates an enumeration tree by designating one, two, or more semantic classes as a single node and, in addition, establishing links between the nodes (see FIG. 7 described below). The search unit 2 then designates the nodes of the enumeration tree as semantic class units.

Then, for each semantic class unit, the search unit 2 identifies a set of class pointers corresponding to said semantic class unit (referred to as the "class pointer strings" below). In Embodiment 1, whenever the search unit 2 creates semantic class units, class pointer strings corresponding to the created semantic class units are supplied to the frequency calculation unit 3 (tag retrieval unit 6, which will be discussed below) as input.

In Embodiment 1, the frequency calculation unit 3 includes a tag retrieval unit 6. The tag retrieval unit 6 is invoked by the entry of class pointer strings by the search unit 2. The tag retrieval unit 6 refers to the tag storage unit 8 to create a list of document IDs of the documents (i.e., matching documents) containing all the entered class pointer strings (referred to as the "tag document list" below). In this manner, the frequency calculation unit 3 identifies the documents (matching documents) matching the semantic class units by comparing the class pointer strings and the tags appended to the tagged documents.

In addition, whenever a tag document list is created by the tag retrieval unit 6, the frequency calculation unit 3 calculates designated document collection frequencies a and non-designated document collection frequencies b. In other words, in Embodiment 1, for each semantic class unit, the frequency calculation unit 3 calculates a designated document collection frequency a and a non-designated document collection frequency b in the descending order of the level of the nodes of said semantic class unit in the enumeration tree.

Specifically, the frequency calculation unit 3 calculates the designated document collection frequencies a using (Eq. 1) below and calculates the non-designated document collection frequencies b using (Eq. 2) below. The frequency calculation unit 3 then outputs the calculated the designated document collection frequencies a and the non-designated document collection frequencies b to the search unit 2.

Designated document collection frequency
$$a=|T\wedge P|/|P| \quad\quad\quad (\text{Eq. 1})$$

Non-designated document collection frequency
$$b=|T\wedge F|/|F| \quad\quad\quad (\text{Eq. 2})$$

In (Eq. 1) and (Eq. 2) above, 'T' indicates a set of document IDs contained in a tag document list. In addition, in (Eq. 1) above, "P" indicates a set of document IDs contained in a query document list. In (Eq. 2) above, "F" indicates a set of document IDs not included in a query document list. In other words, the designated document collection frequencies a are determined based on the number of the document IDs contained in a query document list among the document IDs contained in a tag document list. In addition, the non-designated document collection frequencies b are determined based on the number of the document IDs not included in a query document list among the document IDs contained in a tag document list.

In addition, in Embodiment 1, whenever the frequency calculation unit 3 carries out calculations, the search unit 2 assesses the matching documents subject to calculation as to whether their the designated document collection frequencies a are higher than the inferior limit value α and whether their the non-designated document collection frequencies b are lower than the superior limit value β. Furthermore, in Embodiment 1, the inferior limit value α of the designated document collection frequencies a and the superior limit value β of the non-designated document collection frequencies b are configured as decimals between 0 and 1.

Then, if an assessment is made that the designated document collection frequencies a are higher than the inferior limit value α and the non-designated document collection frequencies b are lower than the superior limit value β, the search unit 2 identifies the semantic class units (i.e., class pointer strings), to which the matching documents subject to calculation correspond. Furthermore, the search unit 2 outputs sets of information elements comprising the identified semantic class units, the designated document collection frequencies a, and the non-designated document collection frequencies b (referred to as the "information sets" below) to the evaluation score calculation unit 5. On the other hand, if an assessment is made that the designated document collection frequencies a are equal to or lower than the inferior limit value α, the search unit 2 stops the above-described process of semantic class creation. As a result, the identification of semantic class units by the search unit 2 is discontinued. It should be noted that the reasons why in this case the search unit 2 discontinues the identification of the semantic class units will be discussed below.

The evaluation score calculation unit 5 calculates evaluation scores f for the semantic class units based on the information sets outputted by the search unit 2. In Embodiment 1, the evaluation scores f are calculated using a function whose value increases either when the designated document collection frequencies a increase, or when the non-designated document collection frequencies b decrease, or when both do so at the same time. Specifically, the following (Eq. 3) is proposed as a function used to calculate the evaluation score f.

Evaluation score $f$=designated document collection frequency $a$/non-designated document collection frequency $b$ (Eq. 3)

In addition, in Embodiment 1, the evaluation score calculation unit 5 uses the evaluation score f to perform further identification of semantic class units and externally outputs the identified semantic class units. For example, the evaluation score calculation unit 5 can identify the semantic class units with the highest evaluation scores f and output them to an external location.

Figure 4:
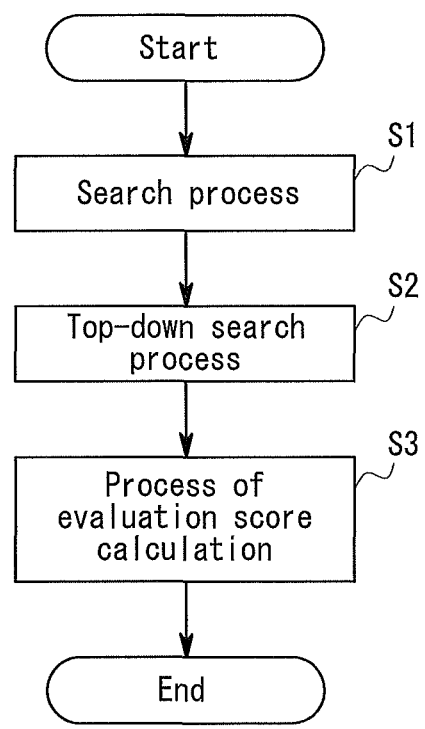
FIG. 4 is a flow chart illustrating the operation of the information processing device used in Embodiment 1 of the present invention.

Next, the operation of the information processing device 1 used in Embodiment 1 of the present invention will be described in its entirety with reference to FIG. 4. FIG. 4 is a flow chart illustrating the operation of the information processing device used in Embodiment 1 of the present invention. In the description that follows, refer to FIG. 1-FIG. 3 as appropriate. In addition, in Embodiment 1, the information processing method is implemented by operating the information processing device 1. Accordingly, the following description of the operation of the information processing device 1 will be used instead of a description of the information processing method of Embodiment 1.

As shown in FIG. 4, once the search terms have been externally entered, a search process is carried out by the body text retrieval unit 4 (Step S1). Specifically, the body text retrieval unit 4 identifies tagged documents matching the search terms and creates a list of document IDs (query document list) representing a set of the identified tagged documents.

Next, a top-down search process is carried out by the search unit 2 and the frequency calculation unit 3 (Step S2). Specifically, in Step S2, the search unit 2 checks the semantic classes in the taxonomy (see FIG. 6 described below) in a top-down manner to create an enumeration tree, and uses the enumeration tree to create semantic class units. Furthermore, whenever the search unit 2 creates semantic class units, it identifies class pointer strings corresponding to said semantic class units and supplies the identified class pointer strings to the frequency calculation unit 3 as input.

In addition, whenever class pointer strings are supplied as input to the frequency calculation unit 3 in Step S2, the tag retrieval unit 6 identifies documents (matching documents) containing all the class pointer strings and creates a list (tag document list) of the document IDs of the identified matching documents. Whenever a tag document list is created, the frequency calculation unit 3 calculates the designated document collection frequencies a and the non-designated document collection frequencies b.

Furthermore, in Step S2, whenever the frequency calculation unit 3 carries out calculations, the search unit 2 makes an assessment as to whether the designated document collection frequencies a are higher than the inferior limit value $\alpha$ and whether the non-designated document collection frequencies b are lower than the superior limit value $\beta$. If an assessment is made that the designated document collection frequencies a are higher than the inferior limit value $\alpha$ and the non-designated document collection frequencies b are lower than the superior limit value $\beta$, the search unit 2 outputs information sets comprising the semantic class units subject to calculation, the designated document collection frequencies a, and the non-designated document collection frequencies b to the evaluation score calculation unit 5.

Next, after performing Step S2, the calculation of an evaluation score is carried out by the evaluation score calculation unit 5 (Step S3). Specifically, the evaluation score calculation unit 5 accepts the information sets as input and calculates evaluation scores f using (Eq. 3) above. The evaluation score calculation unit 5 then identifies the semantic class units with the highest evaluation scores and outputs them to an external location.

Figure 5:
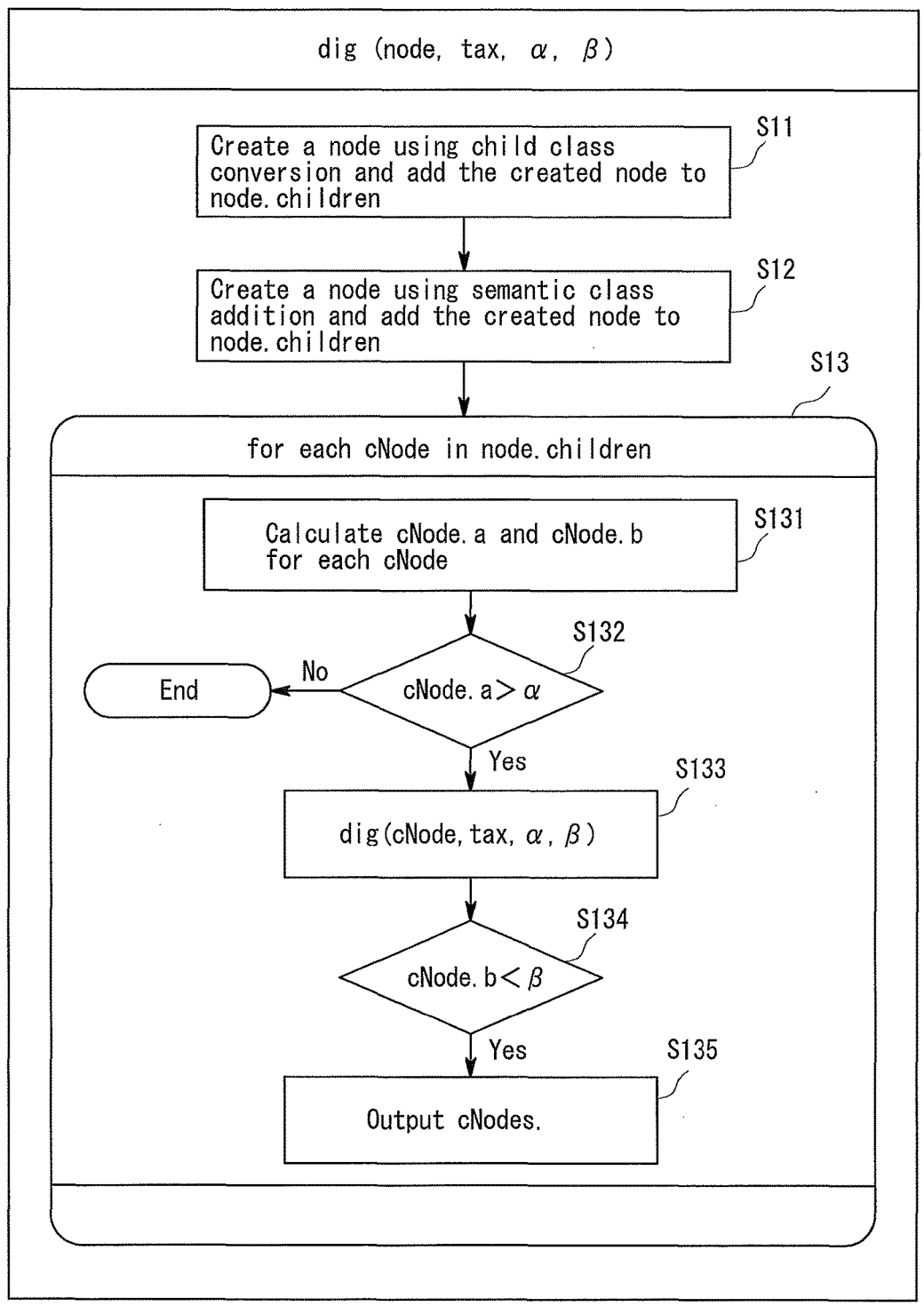
FIG. 5 is a flow chart depicting the top-down search process of FIG. 4.

Next, the top-down search process (Step S2) illustrated in FIG. 4 will be described in greater detail with reference to FIG. 5-FIG. 7. FIG. 5 is a flow chart depicting the top-down search process of FIG. 4.

A description of the processing function used to carry out the top-down search process will be provided before describing the steps of the top-down search process illustrated in FIG. 5. In Embodiment 1, as described below, the information processing device 1 is implemented using a computer. In such a case, the CPU (Central Processing Unit) of the computer carries out processing using a preset processing function. In addition, the CPU operates as the search unit 2, frequency calculation unit 3, body text retrieval unit 4, and evaluation score calculation unit 5. FIG. 5 represents this preset processing function.

In addition, the processing function represented in FIG. 5 is a recursive processing function dig(node, tax, $\alpha$, $\beta$). Furthermore, the processing function dig accepts four information inputs, i.e. "node", "tax", "$\alpha$", and "$\beta$". Among these, "$\alpha$" denotes the inferior limit value $\alpha$ of the designated document collection frequencies a. The element "$\beta$" denotes the superior limit value $\beta$ of the non-designated document collection frequencies b.

Figure 6:
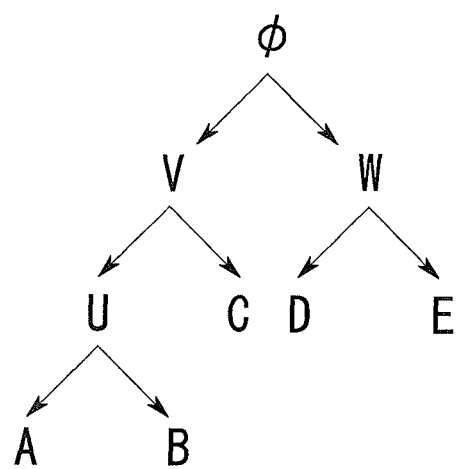
FIG. 6 is a diagram illustrating an exemplary taxonomy used in Embodiment 1 of the present invention.

The element "tax" designates a taxonomy (see FIG. 6). FIG. 6 is a diagram illustrating an exemplary taxonomy used in Embodiment 1 of the present invention. In the taxonomy illustrated in FIG. 6, each letter V, W, U, C, D, E, A, and B respectively represents a semantic class.

The element "node" designates a node in the enumeration tree (see FIG. 7) created from the taxonomy and represents a semantic class unit. FIG. 7 is a diagram illustrating an enumeration tree created based on the taxonomy shown in FIG. 6 in Embodiment 1 of the present invention. Each node constituting the enumeration tree illustrated in FIG. 7, i.e. each semantic class unit, is supplied to dig(node, tax, $\alpha$, $\beta$) as input.

Figure 7:
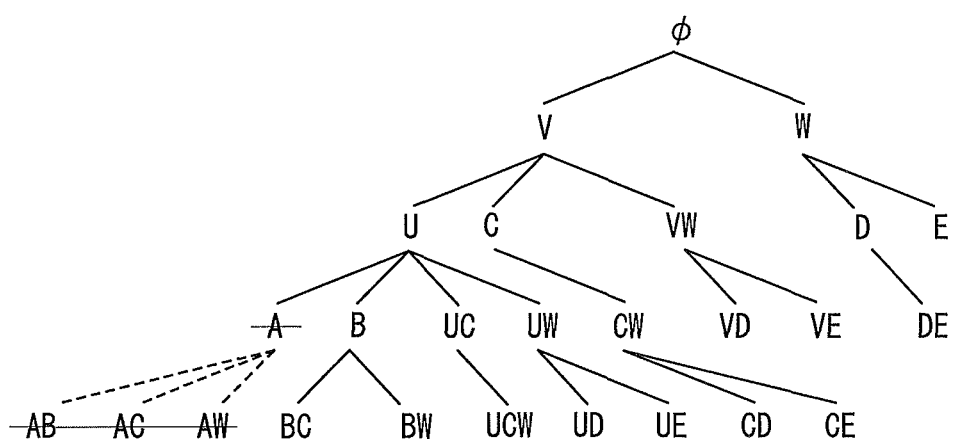
FIG. 7 is a diagram illustrating an enumeration tree created based on the taxonomy illustrated in FIG. 6 in Embodiment 1 of the present invention.

In addition, the enumeration tree illustrated in FIG. 7 is created by traversing the taxonomy illustrated in FIG. 6 in a top-down manner, specifically, by means of two conversion processes whose root is a null set phi, i.e., a child class conversion process and a class addition process. One, two, or more semantic classes constitute each node in the enumeration tree illustrated in FIG. 7.

The "child class conversion process" is a process in which, upon acceptance of a list containing one, two, or more semantic classes as input, the semantic class at the end (the rightmost class) of said list (if the list contains a single semantic class only, then said single semantic class) is converted to a child classes thereof with reference to the taxonomy (see Step S11).

In addition, the "class addition process" is a process, in which semantic classes are added when a list containing one, two, or more semantic classes is accepted as input (see Step S12). Specifically, first of all, when a list of one, two, or more semantic classes is accepted as input during the class addition process, the semantic class at the end (the rightmost class) of the semantic classes (if the list contains a single semantic class only, then said single semantic class) is retrieved. The retrieved semantic class is designated as "Semantic Class X". Next, the taxonomy is referenced and the semantic class located to the right of Semantic Class X, as well as the semantic classes located to the right of the ancestor of Semantic Class X in the taxonomy (brothers of the ancestor of Semantic Class X), are added to the list to be input.

In addition, a relationship whereby "a document collection including the semantic classes of a child node ⊂ a document collection including the semantic classes of a parent node" (referred to as "Proposition A" below) exists between parent nodes and child nodes in the enumeration tree created in this manner.

The reason why Proposition A stands is as follows. First of all, the semantic classes matched by the child nodes created in the child class conversion process correspond to semantic classes limited to the semantic classes matched by the parent node thereof. In addition, child nodes created in the class addition process include one more corresponding semantic class in comparison with the parent node. Accordingly, Proposition A stands because a document collection including a child node created in the child class conversion process or class addition process must be contained in a document collection including a parent node.

Figure 19:
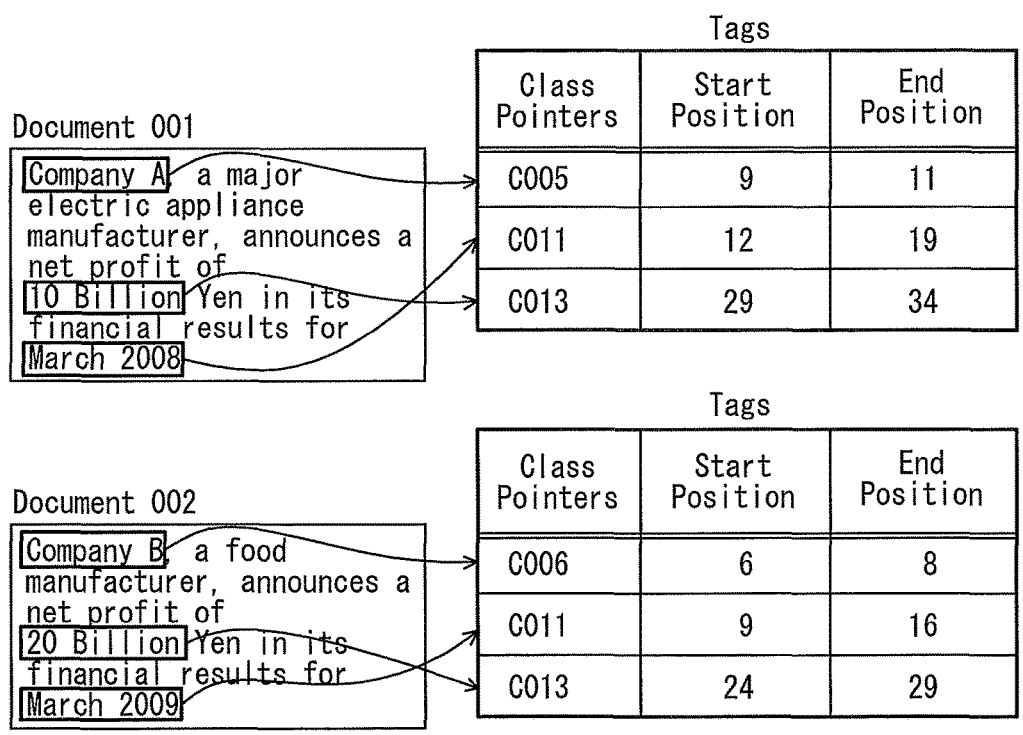
FIG. 19 illustrates an exemplary tagged text.

In addition, as shown in FIG. 19, the semantic classes of the tags attached to each tagged document constitute the semantic classes of the leaf nodes in the enumeration tree. Accordingly, the appearance of each semantic class in a tagged document is determined by whether subordinate semantic classes have appeared, and, therefore, a document collection that includes a semantic class unit constituting a child node must be contained in a document collection that includes a semantic class unit constituting a parent node. This is also why Proposition A stands.

Additionally, Proposition A can be rephrased as follows: "nodes having parent-child relationships in the enumeration tree have a relationship whereby [the designated document collection frequencies a of documents including the semantic classes of the parent nodes] must be >[the designated document collection frequencies a of documents including the semantic classes of the child nodes]".

Here, Steps S11-S13 illustrated in FIG. 5 will be described below by following the flow of the processing function dig(node, tax, $\alpha$, $\beta$). In addition, in FIG. 5, the processing function dig(node, tax, $\alpha$, $\beta$) carries out Steps S11-S13 for each "node" supplied as input.

As shown in FIG. 5, first of all, when a "node" is accepted as input, the search unit 2 invokes the processing function dig(node, tax, $\alpha$, $\beta$), carries out a child class conversion process, and adds child nodes (node.children) to the enumeration tree (Step S11). In Step S11 the search unit 2 performs the process of conversion to a child class on the "node" accepted by the processing function dig(node, tax, $\alpha$, $\beta$) as input.

Specifically, first of all, in Step S11, the search unit 2 identifies the rightmost (last-added) semantic class among the one, two, or more semantic classes (semantic class units) belonging to the "node". If there is one semantic class belonging to the "node" at such time, the search unit 2 identifies this semantic class. Next, the search unit 2 substitutes the identified semantic class for a child class thereof and then creates a new semantic class unit using a non-identified semantic class and the child class obtained by substitution and adds the new semantic class unit to the enumeration tree as a new child node of the inputted "node".

For example, when the processing function dig(node, tax, $\alpha$, $\beta$) accepts Node V as input, two nodes, i.e. Node U and Node C, are added as the child nodes of Node V (see FIG. 7). In addition, when the processing function dig(node, tax, $\alpha$, $\beta$) accepts Node VW as input, two nodes, i.e. Node VD and Node VE, are added as the child nodes of Node VW (see FIG. 7).

Next, the search unit 2 performs a class addition process on the "node" accepted by the processing function dig(node, tax, $\alpha$, $\beta$) as input and adds the child nodes to the enumeration tree (Step S12). Specifically, first of all, in Step S12, the search unit 2 identifies the rightmost (last-added) semantic class among the one, two, or more semantic classes (semantic class units) belonging to the "node". Next, the search unit 2 retrieves the semantic class (referred to as "Semantic Class Y" below) located to the right of the identified semantic class (referred to as "Semantic Class X" below) and the semantic class (referred to as "Semantic Class Z" below) located to the right of the semantic class corresponding to the ancestor of Semantic Class X. The search unit 2 then adds Semantic Class Y or Semantic Class Z to the right of the semantic class units belonging to the "node" and creates a new semantic class unit. In addition, the search unit 2 adds the new semantic class unit to the enumeration tree as a new child node of the inputted "node".

For example, when the processing function dig(node, tax, $\alpha$, $\beta$) accepts Node V as input, Semantic Class W is selected and a new semantic class unit is created that includes Semantic Class V and Semantic Class W. Then, as shown in FIG. 7, Node VW is added as a child node of Node V.

In addition, when the processing function dig(node, tax, $\alpha,\beta$) accepts Node A as input, Semantic Class B, Semantic Class C, and Semantic Class W are retrieved. A new Semantic Class Unit AB, which includes Semantic Class A and Semantic Class B, a new Semantic Class Unit AC, which includes Semantic Class A and Semantic Class C, and a new Semantic Class Unit AW, which includes Semantic Class A and Semantic Class W, are created in this case. As shown in FIG. 7, Node AB, Node AC, and Node AW are then added as child nodes of Node A.

Next, the search unit 2 and frequency calculation unit 3 perform the calculation of the designated document collection frequencies a and the non-designated document collection frequencies b and the "identification" processing of the semantic class units for the child nodes (designated as "cNodes" below) added to the "node" (Step S13). Step S13 is made up of the following Steps S131-S135.

First of all, in Step S131 the search unit 2 supplies, for each cNode, the semantic class units of said cNode to the tag retrieval unit 6 of the frequency calculation unit 3. Specifically, at such time, the search unit 2 supplies class pointer strings corresponding to the semantic class units of the cNode to the tag retrieval unit 6 as input. For example, when the cNode is Node U, the semantic class unit is "U". In addition, when the cNode is Node UW, the semantic class units are "U, W". As a result, the tag retrieval unit 6 checks the tag storage unit 8 and creates, for each cNode, a list of the document IDs ("tag document list") of the documents (matching documents) containing all the entered class pointer strings.

Then, in Step S131, once the tag document lists of each cNode have been created, the frequency calculation unit 3 checks the tag document lists in a sequential manner from the beginning for each cNode and calculates the number of the document IDs included in the query document list ($|T \wedge P|$) and the number of the document IDs not included in the query document list ($|T \wedge F|$). Furthermore, for each cNode, the frequency calculation unit 3 calculates the number |P| of the document IDs included in the query document list and the number |F| of the document IDs not included in the query document list.

Thereafter, in Step S131, for each cNode, the frequency calculation unit 3 substitutes |T∧P| and |P| in (Eq. 1) above to calculate the designated document collection frequencies a for each cNode (designated as "cNode.a" below) and, furthermore, substitutes |T∧F| and |F| in (Eq. 2) above to calculate the non-designated document collection frequencies b for each cNode (designated as "cNode.b" below). In addition, the frequency calculation unit 3 supplies the calculated cNode.a and cNode.b to the search unit 2 as input.

Next, in Step S132, for each cNode, the search unit 2 makes an assessment as to whether cNode.a is larger than the threshold value, i.e. the inferior limit value $\alpha$. If as a result of the assessment made in Step S132 it is determined that cNode.a is larger than the threshold value, i.e. the inferior limit value $\alpha$, the search unit 2 uses the cNode subject to assessment as input and invokes the processing function dig(cNode, tax, $\alpha$, $\beta$) (Step S133). Step S133 will be discussed below.

Then, upon execution of Step S133, in Step S134, the search unit 2 makes an assessment as to whether cNode.b is smaller than the superior limit value $\beta$ serving as a threshold value for the cNode whose cNode.a is larger than the inferior limit value $\alpha$. If as a result of the assessment made in Step S134 it is determined that cNode.b is smaller than the threshold value, i.e. the superior limit value $\beta$, then said cNode constitutes a semantic class unit satisfying the two conditions defined by the inferior limit value $\alpha$ and superior limit value $\beta$. For this reason, in Step S135, the search unit 2 outputs the semantic class units, the designated document collection frequencies a, and the non-designated document collection frequencies b of said cNodes as groups of node information items (information sets). It should be noted that the example of FIG. 15, which is explained in the hereinafter described Working Example 1, is suggested as an example of the output.

In addition, in Step S133, the processing function dig (cNode, tax, $\alpha\beta$) is invoked as described above, thereby causing the search unit 2 to carry out Steps S11-S13 in accordance with the processing function dig(cNode, tax, $\alpha$, $\beta$). As a result, new child nodes are added to the enumeration tree based on the inputted cNode, and, furthermore, calculation and assessment of the designated document collection frequencies a and the non-designated document collection frequencies b is carried out based on the new child nodes.

In other words, the search unit 2 carries out processing by recursively invoking the processing function dig. Accordingly, when the search unit 2 initially invokes dig(phi, tax, $\alpha$, $\beta$), the processing function dig is carried out for each node of the enumeration tree illustrated in FIG. 7 and processing is performed for all the semantic class units created based on the enumeration tree. Therefore, for example, when dig(phi, tax, $\alpha$, $\beta$) is invoked by the search unit 2, the functions dig(V, tax, $\alpha$, $\beta$) and dig(W, tax, $\alpha$, $\beta$) are invoked. Furthermore, when dig(V, tax, $\alpha$, $\beta$) is invoked, the functions dig(U, tax, $\alpha$, $\beta$), dig(C, tax, $\alpha$, $\beta$) and dig(VW, tax, $\alpha$, $\beta$) are invoked. Thus, the search unit 2 repeatedly carries out a top-down search based on the taxonomy (see FIG. 6).

In addition, if as a result of the assessment made in Step S132 it is determined that cNode.a is equal to or lower than the threshold value, i.e. the inferior limit value $\alpha$ (cNode.a≤$\alpha$), the search unit 2 discontinues the search for the subordinate nodes of the cNode subject to assessment. In other words, in this case, the search unit 2 discontinues the calculations performed by the frequency calculation unit 3 in Step S131, the assessment made in Steps S132 and S134, and the invocation of the processing function dig in S133 for nodes located lower than the nodes of the semantic class units created in Step S131.

For example, if the designated document collection frequency a is equal to or lower than $\alpha$ when Node A illustrated in FIG. 7 is subjected to assessment, the designated document collection frequencies a of the child nodes AB, AC, and AW created thereunder must be smaller than $\alpha$. For this reason, the search unit 2 discontinues the search at Node A and can ignore the subordinate Nodes AB, AC and AW.

Thus, in the process depicted in FIG. 5, the device looks only for the nodes (semantic class units) whose the designated document collection frequencies a are larger than $\alpha$ and retrieves nodes (semantic class units), whose the non-designated document collection frequencies b are smaller than $\beta$.

In addition, the software program used in Embodiment 1 of the present invention may be a software program that directs a computer to execute Steps S1-S3 illustrated in FIG. 4 and Steps S11-S13 illustrated in FIG. 5. The information processing device 1 and information processing method used in Embodiment 1 can be implemented by installing and executing this software program on a computer. In such a case, as described above, the CPU of the computer operates and performs processing as the search unit 2, frequency calculation unit 3, body text retrieval unit 4, and evaluation score calculation unit 5. Furthermore, in such a case, the body text storage unit 7 and tag storage unit 8 can be implemented by storing data files that constitute them on a hard disk or another storage device provided in a computer, or in an external storage device connected to a computer.

As described above, in accordance with Embodiment 1, the frequencies are determined not only for user-specified document collections, but also for document collections that have not been specified by the user, which makes it possible to identify semantic class units that occur at high frequency only in the user-specified document collections. In addition, the semantic class units identified in this manner are believed to correspond with high probability to one, two, or more semantic classes specific to the user-specified document collections.

In addition, in Embodiment 1, an evaluation score is obtained for the semantic class units. Produced by taking into consideration frequencies in matching documents and frequencies in non-matching documents, this evaluation score is reliable. Accordingly, the user can determine semantic class units specific to the designated document collection in a simple manner. Furthermore, since in Embodiment 1 an enumeration tree is used to efficiently enumerate the contemplated semantic class units and, in addition, assessments regarding semantic class units can be made in a highly efficient manner, the user can quickly and reliably establish the semantic class units, i.e. the one, two, or more semantic classes, that are specific to the designated document collection.

Embodiment 2

Figure 8:
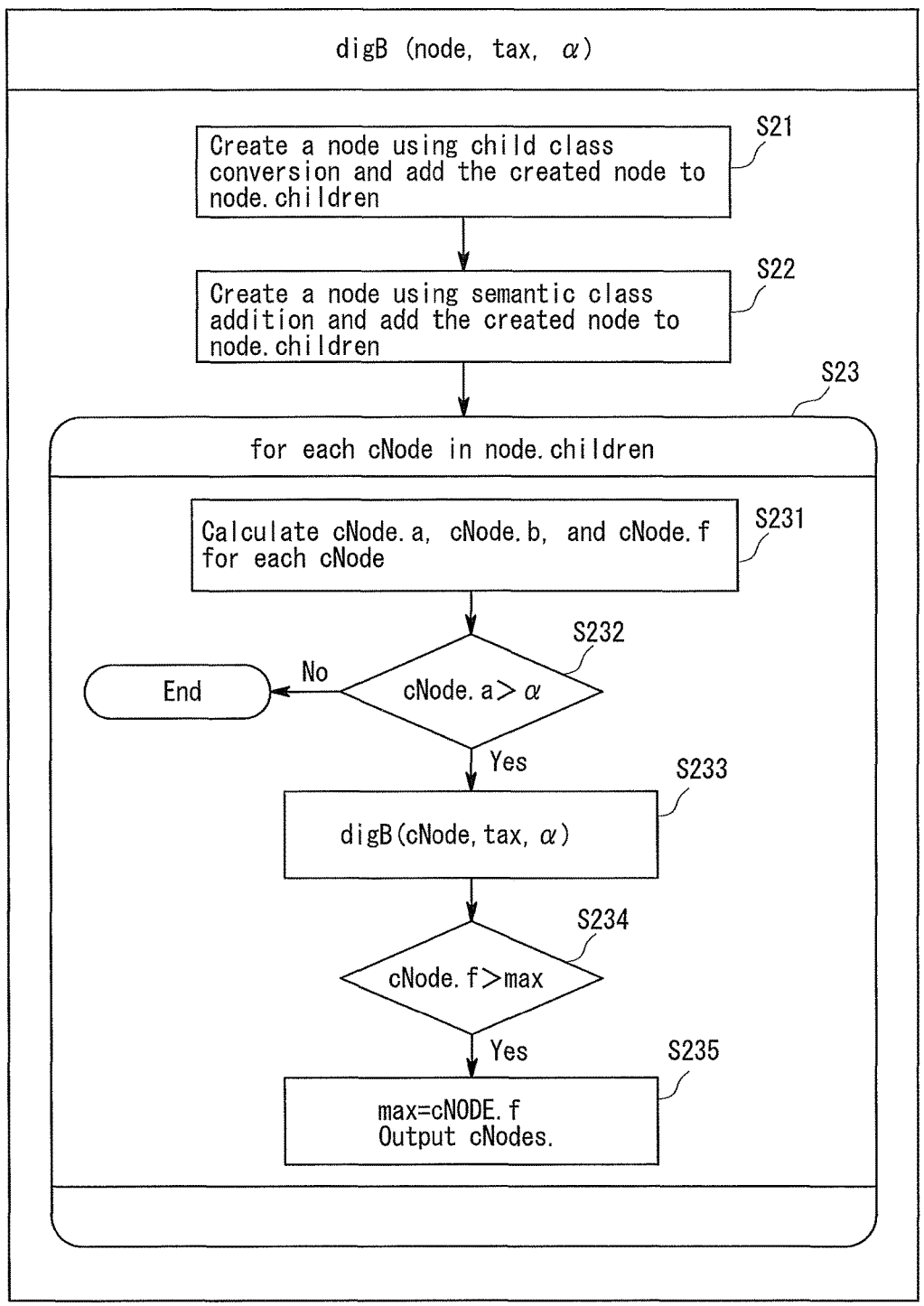
FIG. 8 is a flow chart depicting the top-down search process used in Embodiment 2 of the present invention.

The information processing device, information processing method, and software program used in Embodiment 2 of the present invention will be described next. The information processing device used in Embodiment 2 has a configuration similar to the information processing device used in Embodiment 1, which is illustrated in FIG. 1. However, Embodiment 2 differs from Embodiment 1 from the standpoint of the processing performed by the search unit 2 and evaluation score calculation unit 5. FIG. 8 will be used in the description below with emphasis on the difference from Embodiment 1. In addition, in the description that follows, refer to FIG. 1, FIG. 6, and FIG. 7 as appropriate. FIG. 8 is a flow chart depicting the top-down search process used in Embodiment 2 of the present invention.

As shown in FIG. 8, in Embodiment 2, a top-down search process is carried out using the processing function digB (node, tax, $\alpha$) in a different manner than in Embodiment 1. In addition, unlike the processing function dig used in the Embodiment 1, the processing function digB accepts three information inputs, i.e. "node", "tax", and "$\alpha$". It should be noted that these information inputs are similar to those explained in Embodiment 1.

In addition, first of all, as shown in FIG. 8, when a "node" is accepted as input to the function digB(node, tax, $\alpha$), the search unit 2 invokes the processing function dig(node, tax, $\alpha$), carries out a child class conversion process, and adds child nodes to the enumeration tree (Step S21). Next, the search unit 2 performs a class addition process on the "node" accepted by the processing function dig(node, tax, $\alpha$) as input and adds the child nodes to the enumeration tree (Step S22). It should be noted that Steps S21 and S22 are respectively identical to Steps S11 and S12 illustrated in FIG. 5 in Embodiment 1.

Next, the search unit 2 and frequency calculation unit 3 perform the calculation of the designated document collection frequencies a and the non-designated document collection frequencies b and the "identification" processing of the semantic class units for the child nodes (designated as "cNodes" below) added to the "node" (Step S23). Step S23 is made up of the following Steps S231-S235.

First of all, in Step S231 the search unit 2 supplies, for each cNode, the semantic class units of said cNode to the tag retrieval unit 6 of the frequency calculation unit 3. Specifically, at such time, the search unit 2 supplies class pointer strings corresponding to the semantic class units of the cNode to the tag retrieval unit 6 as input. As a result, the tag retrieval unit 6 creates a tag document list of the documents (matching documents) containing all the entered class pointer strings.

In addition, in Step S231, once the tag document lists of each cNode have been created, the frequency calculation unit 3 uses (Eq. 1) and (Eq. 2) above to calculate the designated document collection frequencies a (cNode.a) and the non-designated document collection frequencies b (cNode.b) for each cNode. In addition, the frequency calculation unit 3 supplies the calculated cNode.a and cNode.b to the search unit 2 and also supplies them to the evaluation score calculation unit 5 as input.

Then, in Step S231, the evaluation score calculation unit 5 calculates evaluation scores f for each cNode (referred to as "cNode.f" below) using the inputted the designated document collection frequencies a (cNode.a) and the non-designated document collection frequencies b (cNode.b). In addition, the evaluation score calculation unit 5 supplies the calculated cNode.f to the search unit 2 as input. At such time the search unit 2 identifies the largest value selected from the inputted cNode.f and the already calculated cNode.f and holds it as the maximum value max.

Next, in Step S232, for each cNode, the search unit 2 makes an assessment as to whether cNode.a is larger than the inferior limit value $\alpha$. If as a result of the assessment made in Step S232 it is determined that cNode.a is larger than the inferior limit value $\alpha$, the search unit 2 uses the cNode subject to assessment as input and invokes the processing function digB(cNode, tax, $\alpha$) (Step S233). It should be noted that Steps S232 and S233 are respectively identical to Steps S132 and S133 illustrated in FIG. 5 in Embodiment 1.

Then, upon execution of Step S233, in Step S234, the search unit 2 makes an assessment as to whether cNode.f is larger than the current maximum value max for the cNodes whose cNode.a is larger than the inferior limit value $\alpha$ (Step S234). If as a result of the assessment made in Step S234 it is determined that cNode.f is larger than the maximum value max the search unit 2 outputs the semantic class units, the designated document collection frequencies a, and the non-designated document collection frequencies b of the cNodes whose cNode.f is larger than the maximum value max as groups of node information items (information sets) (Step S235).

In addition, in the same manner as in Step S132 illustrated in FIG. 5, if as a result of the assessment made in Step S232 it is determined that cNode.a is equal to or lower than the threshold value, i.e. the inferior limit value $\alpha$ (cNode.a$\leq\alpha$), the search unit 2 discontinues the search for the subordinate nodes of the cNode subject to assessment.

Furthermore, the software program used in Embodiment 2 of the present invention may be a software program that directs a computer to execute Steps S1, S3 illustrated in FIG. 4 and Steps S21-S23 illustrated in FIG. 8. The information processing device and information processing method used in Embodiment 2 can be implemented by installing and executing this software program on a computer. In such a case, in the same manner as in Embodiment 1, the CPU of the computer operates and performs processing as the search unit 2, frequency calculation unit 3, body text retrieval unit 4, and evaluation score calculation unit 5. Furthermore, the body text storage unit 7 and tag storage unit 8 can be implemented by storing data files that constitute them on a hard disk or another storage device provided in a computer, or in an external storage device connected to a computer.

Thus, in Embodiment 2, the processing function digB does not require the input of the superior limit value $\alpha$ for the non-designated document collection frequencies b and the user does not need to configure the superior limit value $\beta$ in advance. For this reason, if the information processing device of Embodiment 2 is used, the user's administrative burden is reduced in comparison with the information processing device according to Embodiment 1. In addition, the effects described in Embodiment 1 can also be obtained in Embodiment 2.

Embodiment 3

Figure 9:
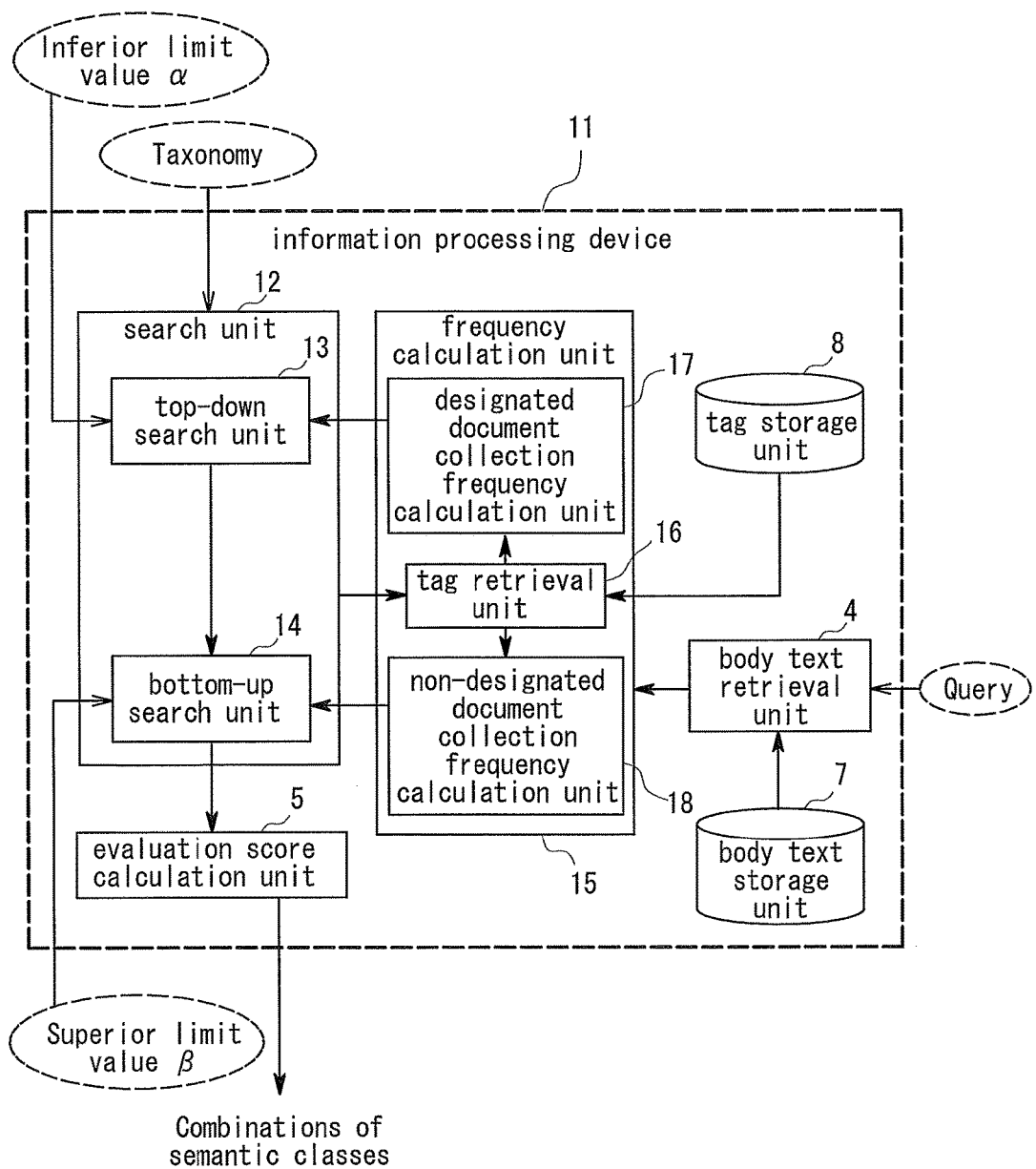
FIG. 9 is a block diagram illustrating the configuration of the information processing device used in Embodiment 3 of the present invention.

Next, the information processing device, information processing method, and software program used in Embodiment 3 of the present invention will be described with reference to FIG. 9-FIG. 14. First of all, the configuration of the information processing device 11 used in Embodiment 3 will be described with reference to FIG. 9. FIG. 9 is a block diagram illustrating the configuration of the information processing device used in Embodiment 3 of the present invention.

As shown in FIG. 9, the information processing device 11 used in Embodiment 3 is provided with a search unit 12, a frequency calculation unit 15, a body text retrieval unit 4, an evaluation score calculation unit 5, a body text storage unit 7, and a tag storage unit 8. Among the above, the body text retrieval unit 4, evaluation score calculation unit 5, body text storage unit 7, and tag storage unit 8 are similar to the units illustrated in FIG. 1 in Embodiment 1. However, in terms of configuration and functionality, the search unit 12 and frequency calculation unit 15 are different from the search unit 2 and frequency calculation unit 3 illustrated in FIG. 1. The discussion below will concentrate on differences from Embodiment 1.

As shown in FIG. 9, in the information processing device 11, the search unit 12 includes a top-down search unit 13 and a bottom-up search unit 14. In addition, the frequency calculation unit 15 includes a tag retrieval unit 16, a designated document collection frequency calculation unit 17, and a non-designated document collection frequency calculation unit 18.

In Embodiment 3, the tag retrieval unit 16 is invoked by the entry of class pointer strings by the hereinafter described top-down search unit 13 or bottom-up search unit 14. In the same manner as the tag retrieval unit 6 illustrated in FIG. 1, the tag retrieval unit 16 creates a tag document list of the documents (matching documents) containing all the entered class pointer strings.

The designated document collection frequency calculation unit 17 initiates processing when the tag retrieval unit 16 creates a tag document list upon entry of class pointer strings from the top-down search unit 13. Then, first of all, the designated document collection frequency calculation unit 17 checks the query document list outputted from the body text retrieval unit 4 in a sequential manner starting from the beginning and loads records from the tag storage unit 8 under the document IDs used in the query document list.

Next, the designated document collection frequency calculation unit 17 counts the number $|T \wedge P|$ of the document IDs included in the query document list among the document IDs contained in the tag document list and uses the results to calculate the designated document collection frequencies a, which it outputs to the top-down search unit 13. At such time, the designated document collection frequency calculation unit 17 calculates the designated document collection frequencies a for each semantic class unit in the descending order of the level of the nodes of said semantic class units in the enumeration tree.

In addition, the non-designated document collection frequency calculation unit 18 initiates processing when the tag retrieval unit 16 creates a tag document list upon entry of class pointer strings from the bottom-up search unit 14. Then, first of all, the non-designated document collection frequency calculation unit 18 checks the records in the tag storage unit 8 in a sequential manner starting from the beginning and loads records having the document IDs not included in the query document list.

Next, the non-designated document collection frequency calculation unit 18 counts the number $|T \wedge F|$ of the document IDs not included in the query document list among the document IDs contained in the tag document list and uses the results to calculate the non-designated document collection frequencies b, which it outputs to the bottom-up search unit 14. At such time, the non-designated document collection frequency calculation unit 18 calculates the non-designated document collection frequencies b for each semantic class unit in the ascending order of the level of the nodes of said semantic class units in the enumeration tree.

The top-down search unit 13 operates by accepting a taxonomy and the inferior limit value α of the designated document collection frequencies a as input. In Embodiment 3, the inferior limit value α is configured as a decimal between 0 and 1. In addition, in the same manner as the search unit 2 illustrated in FIG. 1, as the top-down search unit 13 traverses the taxonomy from the top level to the bottom level, it creates an enumeration tree by designating one, two, or more semantic classes as a node and establishing links between the nodes. The top-down search unit 13 then designates the nodes of the enumeration tree as semantic class units.

Figure 10:
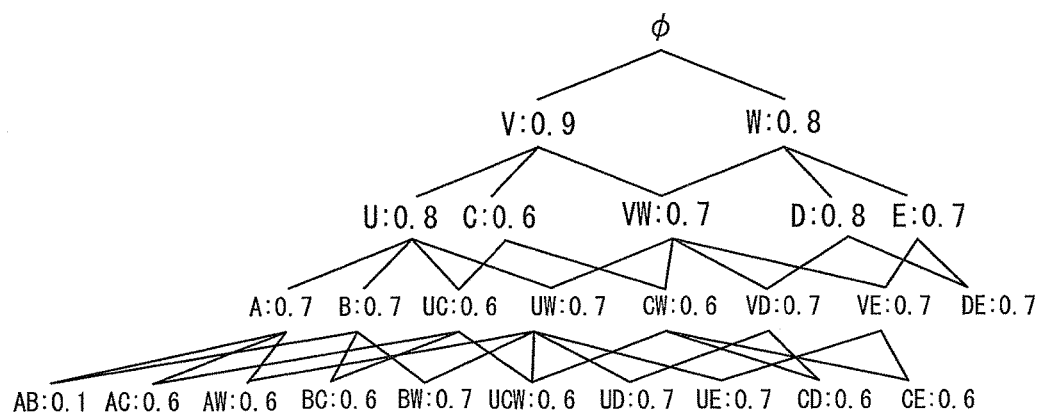
FIG. 10 is a diagram illustrating an enumeration tree created based on a taxonomy in Embodiment 3 of the present invention.

However, in Embodiment 3, whenever it creates the semantic class units, in other words, whenever it creates nodes for the semantic class units, the top-down search unit 13 invokes the designated document collection frequency calculation unit 17, directing it to calculate the designated document collection frequencies a and attaching the calculated values to each node (see FIG. 10). FIG. 10 is a diagram illustrating an enumeration tree created based on a taxonomy in Embodiment 3 of the present invention.

In addition, whenever the designated document collection frequencies a are calculated, the top-down search unit 13 makes an assessment as to whether the designated document collection frequencies a are higher than the inferior limit value α. If an assessment is made that the designated document collection frequencies a are equal to or lower than the inferior limit value α, the top-down search unit 13 designates the semantic class units subject to calculation, in other words, the created nodes, as items subject to exclusion and deletes the nodes subject to exclusion from the enumeration tree.

Thus, while the enumeration tree illustrated in FIG. 10 represents data similar to the enumeration tree created by the search unit 2 in Embodiment 1 (see FIG. 7), it is different in that the designated document collection frequencies a are attached to the nodes and the nodes whose the designated document collection frequencies a are equal to or lower than the inferior limit value α are excluded. In addition, the enumeration tree illustrated in FIG. 10 is also different from the enumeration tree created by the search unit 2 in Embodiment 1 in that links indicating parent-child relationships that can be logically inferred by analogy are added between the nodes. This point is explained below.

As shown in FIG. 10, the semantic class units and the designated document collection frequencies a are shown for each node of the enumeration tree in the format "semantic class unit: designated document collection frequency a". In the enumeration tree illustrated in FIG. 10, the number of links is increased in comparison with the enumeration tree illustrated in FIG. 6. This is due to the fact that links indicating parent-child relationships that can be logically inferred by analogy are added between the nodes in the enumeration tree illustrated in FIG. 10.

For example, in the example of FIG. 10, there is a link between Node VW and Node W, whereas in the example of FIG. 6 there are no links between Node W and Node VW. The presence of such a link means that a document collection including Semantic Class Unit "VW" must be contained in a document collection including Semantic Class Unit "W".

Thus, when the semantic class unit of a certain node in the enumeration tree is included in the semantic class of a non-parent node located above said node, the top-down search unit 13 establishes a new link between said node and the non-parent node located thereabove. In other words, when a containment relationship can be inferred by analogy between a document collection including the semantic class units of a certain node and a document collection including the semantic class units of a certain node located above this node, the top-down search unit 13 adds a link between these nodes. In addition, after adding the link, the top-down search unit 13 outputs the enumeration tree to the bottom-up search unit 14.

The bottom-up search unit 14 operates by accepting the enumeration tree created by the top-down search unit 13 and the superior limit value β of the non-designated document collection frequencies b as input. The bottom-up search unit 14 then looks for semantic class units whose the non-designated document collection frequencies b are lower than the superior limit value β in the enumeration tree in bottom-up manner.

Specifically, the bottom-up search unit 14 directs the non-designated document collection frequency calculation unit 18 to perform the calculation of the non-designated document collection frequencies b for a set of semantic class units obtained by removing the semantic class units of the nodes subject to exclusion. In addition, whenever the calculations are performed, the bottom-up search unit 14 makes an assessment as to whether the non-designated document collection frequencies b are lower than the superior limit value β.

Then, if the non-designated document collection frequencies b are equal to or higher than the superior limit value β, the bottom-up search unit 14 deletes the nodes of the semantic class units subject to calculation and all the superordinate nodes directly and indirectly coupled to said nodes from the enumeration tree.

Thereafter, the bottom-up search unit 14 identifies the semantic class units obtained from the nodes remaining in the enumeration tree and outputs information sets made up of the identified semantic class units, the designated document collection frequencies a, and the non-designated document collection frequencies b to the evaluation score calculation unit 5.

Figure 11:
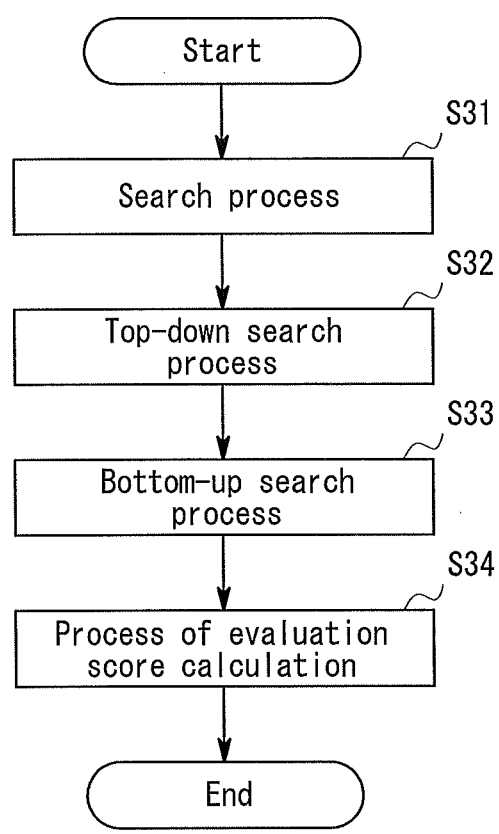
FIG. 11 is a flow chart illustrating the operation of the information processing device used in Embodiment 3 of the present invention.

Next, the operation of the information processing device 11 used in Embodiment 3 of the present invention will be described in its entirety with reference to FIG. 11. FIG. 11 is a flow chart illustrating the operation of the information processing device used in Embodiment 3 of the present invention. In the description that follows, refer to FIG. 9 and FIG. 10 as appropriate. In addition, in Embodiment 3, the information processing method is also implemented by operating the information processing device 11. Accordingly, the following description of the operation of the information processing device 11 will be used instead of a description of the information processing method of Embodiment 3.

First of all, as shown in FIG. 11, once the search terms have been externally entered, a search process is carried out by the body text retrieval unit 4 (Step S31). Specifically, the body text retrieval unit 4 identifies tagged documents matching the search terms and creates a list of document IDs (query document list) representing a set of the identified tagged documents. Step S31 is a step similar to Step S1 illustrated in FIG. 4 in Embodiment 1.

Next, a top-down search process is carried out by the top-down search unit 13 and the designated document collection frequency calculation unit 17 (Step S32). Subsequently, a bottom-up search process is carried out by the bottom-up search unit 14 and the non-designated document collection frequency calculation unit 18, and information sets are outputted (Step S33). In Step S33, the bottom-up search unit 14 carries out a bottom-up search by accepting the enumeration tree obtained in Step S32 as input. It should be noted that a specific example of Step S32 will be discussed below with reference to FIG. 12. A specific example of Step S33 will be discussed below with reference to FIG. 14.

Next, the calculation of an evaluation score is carried out by the evaluation score calculation unit 5 (Step S34). In Step S34, the evaluation score calculation unit 5 calculates evaluation scores f by accepting the information sets (semantic class units, the designated document collection frequencies a, and the non-designated document collection frequencies b) outputted from the bottom-up search unit 14 as input. In addition, the evaluation score calculation unit 5 outputs the semantic class units with the highest evaluation scores. Step S34 is a step similar to Step S3 illustrated in FIG. 4 in Embodiment 1. In the same manner as in Embodiment 1, "a"/"b" (see Eq. 3) is suggested as an example of the function used to calculate the evaluation score f.

Figure 12:
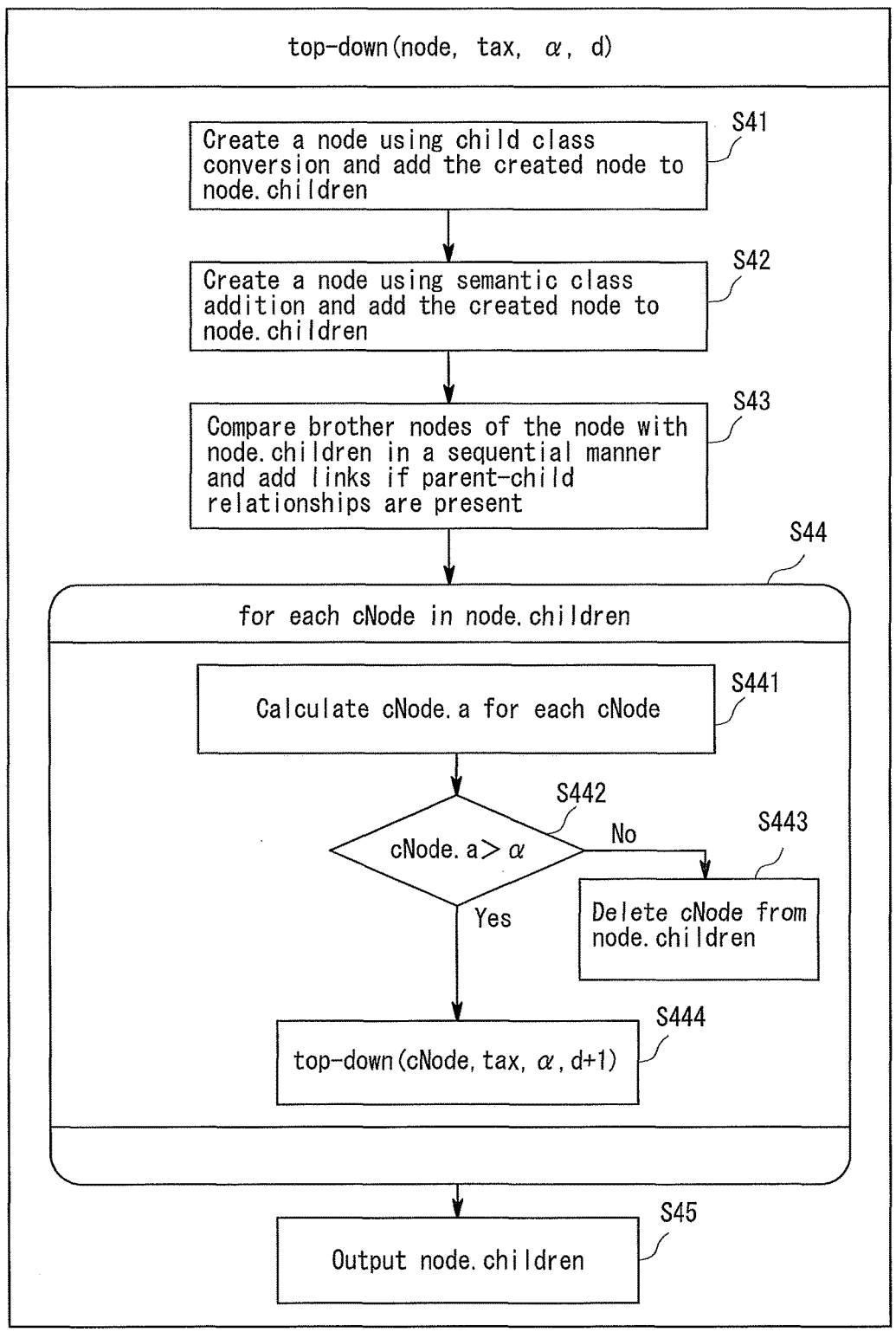
FIG. 12 is a flow chart depicting the top-down search process of FIG. 11.

Next, the top-down search process (Step S32) illustrated in FIG. 11 will be described in greater detail with reference to FIG. 12 and FIG. 13. FIG. 12 is a flow chart depicting the top-down search process of FIG. 11. FIG. 13 is a diagram illustrating the nodes of an enumeration tree obtained by the top-down search process shown in FIG. 12.

In the same manner as FIG. 5, FIG. 12 illustrates a processing function used to carry out a top-down search process. In addition, in Embodiment 3, the information processing device 11 can be built using a computer, with the CPU of the computer carrying out processing based on the processing function illustrated in FIG. 12. The processing function represented in FIG. 12 is a recursive processing function top-down(node, tax, α, d). The processing function top-down accepts four information inputs, i.e. "node", "tax", "α", and "d". Among these, "node", "tax" and "d" represent information that is also supplied to the processing function dig illustrated in FIG. 5. The argument "d" is a value representing the depth of search used when the processing function top-down is executed, with its initial value set to "0".

Here, Steps S41-S44 illustrated in FIG. 12 will be described below by following the flow of the processing function top-down(node, tax, α, d). In addition, in FIG. 11, the processing function top-down(node, tax, α, d) carries out Steps S41-S45 for each "node" supplied as input.

First of all, as shown in FIG. 12, when a "node" is accepted as input, the top-down search unit 13 invokes the processing function top-down(node, tax, α, d), carries out a child class conversion process, and adds the child nodes to the enumeration tree (Step S41). Step S41 is a step similar to Step S11 illustrated in FIG. 5.

Next, the top-down search unit 13 performs a class addition process on the "node" accepted by the processing function top-down(node, tax, α, d) as input and adds the child nodes to the enumeration tree (Step S42). Step S42 is a step similar to Step S12 illustrated in FIG. 5.

Next, in accordance with the processing function top-down, the top-down search unit 13 adds links indicating parent-child relationships that can be logically inferred by analogy between the child nodes (node.children) created in the foregoing process and the nodes located thereabove (Step S43).

Specifically, first of all, in Step S43 the top-down search unit 13 acquires a list enumerating all the semantic class units in node.children (called "List A" below) and a list enumerating all the semantic class units in the brother nodes of the inputted "node" (called "List B" below). It should be noted that the term "brother nodes of the "node"" refers to the nodes having the same parent node located to the right of the "node".

Then, in Step S43, the top-down search unit 13 compares List A and List B. During this comparison, the parent class of a single arbitrary semantic class unit on List A is identified by referring to the taxonomy (see FIG. 6) and an assessment is made as to whether or not the identified parent class is identical to a semantic class unit listed on List B. In addition, if during this comparison the single arbitrary semantic class unit on List A includes two or more semantic classes, only one semantic class is left and the other one is deleted, whereupon an assessment is made as to whether or not the parent class of the remaining semantic class is identical to a semantic class unit listed on List B.

Subsequently, in Step S43, the top-down search unit 13 creates a link that joins the two nodes together if they have been assessed to be identical during either one of the above-described two assessments. This is done because it is believed that a parent-child relationship exists between the target node on List A and the parent-class node.

Next, the top-down search unit 13 and the designated document collection frequency calculation unit 17 perform the calculation of the designated document collection frequencies a for the child nodes (cNode) added to the "node" and perform a recompilation of the enumeration tree (Step S44). Step S44 is made up of the following Steps S441-S444.

First of all, in Step S441, the top-down search unit 13 supplies, for each cNode, the semantic class units of said cNode to the tag retrieval unit 16 of the frequency calculation unit 15 as input. Specifically, at such time, the top-down search unit 13 supplies class pointer strings corresponding to the semantic class units of the cNode to the tag retrieval unit 16 as input. As a result, the tag retrieval unit 16 checks the tag storage unit 8 and creates, for each cNode, a list of the document IDs ("tag document list") of the documents (matching documents) containing all the entered class pointer strings. It should be noted that the processing performed in the tag retrieval unit 16 is similar to the processing of Step S131 illustrated in FIG. 5.

Then, in Step S441, once the tag document lists of each cNode have been created, the designated document collection frequency calculation unit 17 checks the tag document lists in a sequential manner from the beginning for each cNode and calculates the number of the document IDs included in the query document list ($|T \wedge P|$). Furthermore, for each cNode, the designated document collection frequency calculation unit 17 calculates the number $|P|$ of the document IDs included in the query document list and uses (Eq. 1) above to calculate the designated document collection frequencies a (cNode.a) for each cNode.

Next, in Step S442, for each cNode, the top-down search unit 13 makes an assessment as to whether cNode.a is larger than the inferior limit value $\alpha$. If as a result of the assessment made in Step S442 it is determined that cNode.a is larger than the inferior limit value $\alpha$, the top-down search unit 13 uses the cNode subject to assessment as input and invokes the processing function top-down(cNode, tax, $\alpha$, d+1) (Step S444). On the other hand, if as a result of the assessment made in Step S442 it is determined that cNode.a is equal to or lower than the inferior limit value $\alpha$, the top-down search unit 13 deletes the cNode subject to assessment from the enumeration tree and presumes it to be non-existent as a child node of the inputted "node" (Step S443).

After that the top-down search unit 13 outputs a set of remaining child nodes, node.children, to the bottom-up search unit 14 (Step S45). An example of the nodes of the enumeration tree output in Step S45 is illustrated in FIG. 13. FIG. 13 is a diagram illustrating the nodes of an enumeration tree obtained by the top-down search process shown in FIG. 12. As shown in FIG. 13, the output of Step S45 includes four types of information, i.e. parent-node semantic class units, child-node semantic class units, the designated document collection frequencies a (cNode.a) of the cNodes, and depth d. Using the output illustrated in FIG. 13 makes it possible to reproduce the enumeration tree shown in FIG. 10.

In addition, in Step S444, the processing function top-down(cNode, tax, $\alpha$, d+1) is invoked as described above and, as a result, the top-down search unit 13 carries out Steps S41-S45 in accordance with the processing function top-down(cNode, tax, $\alpha$, d+1). As a result, new child nodes are added to the enumeration tree based on the inputted cNodes, and, furthermore, the addition of link, the calculation and assessment of the designated document collection frequencies a, and the recompilation of the enumeration tree are carried out on the new child nodes.

Figure 14:
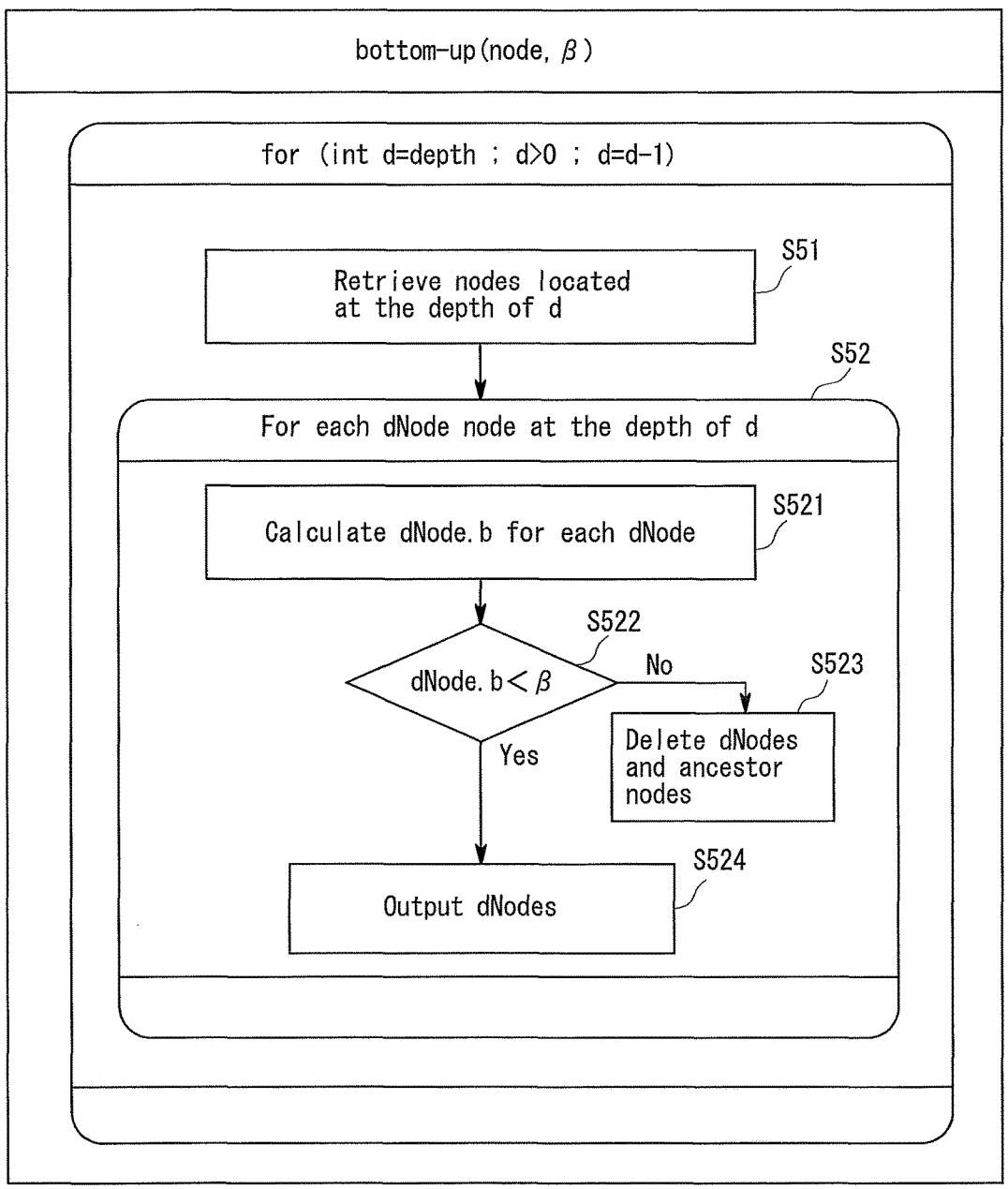
FIG. 14 is a flow chart depicting the bottom-up search process of FIG. 11.

Next, the bottom-up search process (Step S33) illustrated in FIG. 11 will be described in greater detail with reference to FIG. 14. FIG. 14 is a flow chart depicting the bottom-up search process of FIG. 11.

FIG. 14 illustrates a processing function used to carry out a top-down search process. In addition, in Embodiment 3, the information processing device 11 can be built using a computer, with the CPU of the computer carrying out processing based on the processing function illustrated in FIG. 14. The processing function represented in FIG. 14 is a recursive processing function bottom-up(node, $\beta$). The processing function bottom-up accepts two information inputs, i.e. "node" and "$\beta$", which represent information that is also supplied as input to the processing function dig illustrated in FIG. 5.

Here, Steps S51-S52 illustrated in FIG. 14 will be described below by following the flow of the processing function bottom-up(node, $\beta$). In addition, in FIG. 14, the processing function bottom-up(node, $\beta$) carries out Steps S51-S52 for each "node" supplied as input.

First of all, as shown in FIG. 14, when a "node" is accepted as input, the bottom-up search unit 14 invokes the processing function bottom-up(node, $\beta$) and retrieves all the nodes at the depth of d (Step S51). Here, the maximum value of the depth d of the enumeration tree is referred to as "depth" and when the bottom-up search unit 14 carries out the initial Step S51, it retrieves all the nodes at the depth d. It should be noted that in the description that follows the nodes retrieved in Step S51 are denoted "dNode".

Next, the bottom-up search unit 14 and the non-designated document collection frequency calculation unit 18 perform the calculation and assessment of the non-designated document collection frequencies b, as well as the "identification" processing of the semantic class units for the child nodes ("dNodes") retrieved in Step S51 (Step S52). Step S52 is made up of the following Steps S521-S524.

First of all, in Step S521, the bottom-up search unit 14 supplies, for each dNode, the semantic class units of said dNode to the tag retrieval unit 16 as input. Specifically, at such time, the bottom-up search unit 14 supplies class pointer strings corresponding to the semantic class units of the dNode to the tag retrieval unit 16 as input. As a result, the tag retrieval unit 16 checks the tag storage unit 8 and creates, for each dNode, a list of the document IDs ("tag document list") of the documents (matching documents) containing all the entered class pointer strings.

Then, in Step S521, once the tag document lists of each dNode have been created, the non-designated document collection frequency calculation unit 18 checks the tag document lists in a sequential manner from the beginning for each dNode and calculates the number of the document IDs not included in the query document list ($|T \wedge F|$). Furthermore, for each dNode, the non-designated document collection frequency calculation unit 18 calculates the number $|F|$ of the document IDs not included in the query document list and uses (Eq. 2) above to calculate the non-designated document collection frequencies b (hereinafter referred to as cNode.b) for each dNode.

Next, in Step S522, for each dNode, the bottom-up search unit 14 makes an assessment as to whether the non-designated document collection frequencies b are smaller than the threshold value, i.e. the superior limit value $\beta$. If as a result of the assessment made in Step S522 it is determined that dNode.b is equal to or higher than the superior limit value $\beta$, the bottom-up search unit 14 deletes the dNode subject to assessment and all the superordinate nodes directly and indirectly coupled to said dNode, i.e. the ancestor nodes, from the enumeration tree (Step S523).

On the other hand, if as a result of the assessment made in Step S522 it is determined that dNode.b is smaller than the superior limit value $\beta$, the bottom-up search unit 14 outputs the semantic class units, the designated document collection frequency a, and the non-designated document collection frequency b of said dNode as a group of node information items (information sets) (Step S524). In other words, the semantic class units of the nodes that have not been deleted from the enumeration tree, as well as the corresponding the designated document collection frequencies a and the non-designated document collection frequencies b are outputted as a result. It should be noted that exemplary output is similar to that of Embodiment 1 (see FIG. 15).

In addition, the software program used in Embodiment 3 of the present invention may be a software program that directs a computer to execute Steps S31-S34 illustrated in FIG. 11, Steps S41-S45 illustrated in FIG. 12, and Steps S51-S52 illustrated in FIG. 14. The information processing device 11 and information processing method used in Embodiment 3 can be implemented by installing and executing this software program on a computer. In such a case, the CPU of the computer operates and performs processing as the search unit 12, frequency calculation unit 15, body text retrieval unit 4, and evaluation score calculation unit 5. Furthermore, in such a case, the body text storage unit 7 and tag storage unit 8 can be implemented by storing data files that constitute them on a hard disk or another storage device provided in a computer, or in an external storage device connected to a computer.

Thus, in Embodiment 3, there is no need to calculate the non-designated document collection frequencies b for all the nodes. For this reason, Embodiment 3 makes it possible to acquire one, two, or more semantic classes specific to a user-specified document collection faster than in Embodiment 1. This point is explained below.

When the search unit 2 carries out a search in Embodiment 1, the calculation of the non-designated document collection frequencies b is performed for all the nodes in the enumeration tree. On the other hand, for nodes located higher in the enumeration tree, the values of the non-designated document collection frequencies b often exceed the superior limit value $\beta$. In other words, when the non-designated document collection frequencies b of the documents including the semantic classes of the child nodes is equal to or higher than the superior limit value $\beta$, the non-designated document collection frequencies b of their parent nodes and, furthermore, their ancestor nodes, must also be higher than the superior limit value $\beta$. For this reason, in Embodiment 1, calculations may sometimes be unnecessary.

By contrast, Embodiment 3 makes use of the property that follows from Proposition A, i.e. "nodes having parent-child relationships in the enumeration tree have a relationship whereby [the non-designated document collection frequencies b of documents including the semantic classes of the parent nodes] must be >[the non-designated document collection frequencies b of documents including the semantic classes of the child nodes]". Accordingly, in Embodiment 3, the non-designated document collection frequencies b are checked in a bottom-up manner starting from the child nodes located below and unnecessary calculations of the non-designated document collection frequencies bare eliminated. For this reason, as described above, Embodiment 3 makes it possible to quickly retrieve one, two, or more semantic classes specific to a user-specified document collection.

Figure 22:
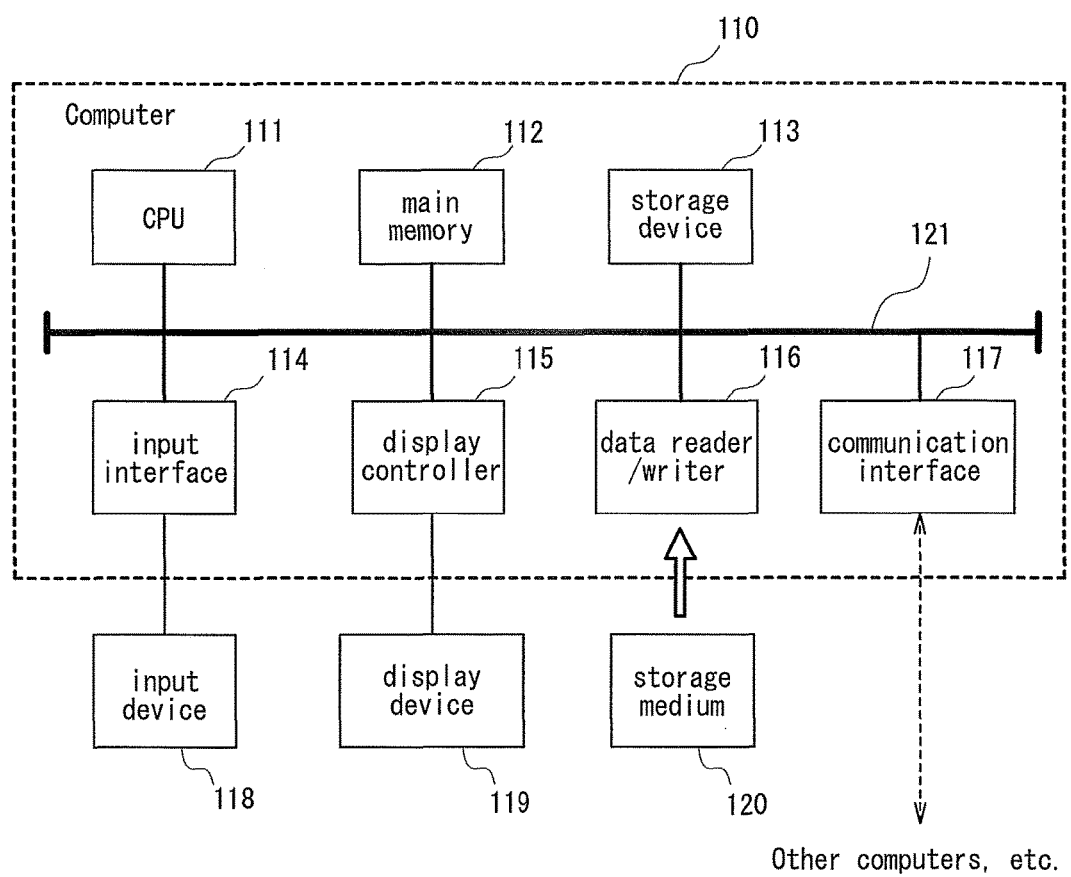
FIG. 22 is a block diagram illustrating a computer capable of running the software program used in Embodiments 1-3 of the present invention.

Here, the computer used to implement the information processing device by running the software program used in Embodiments 1-3 will be described with reference to FIG. 22. FIG. 22 is a block diagram illustrating a computer capable of running the software program used in Embodiments 1-3 of the present invention.

As shown in FIG. 22, the computer 120 includes a CPU 121, a main memory 122, a storage device 123, an input interface 124, a display controller 125, a data reader/writer 126, and a communication interface 127. These components are interconnected through a bus 131 to allow for mutual communication of data.

The CPU 121 loads the software programs (code) used in Embodiments 1-3, which are stored in the storage device 123, into the main memory 122 and performs various computations by executing them in a predetermined order. The main memory 122 is typically a volatile storage device, such as a DRAM (Dynamic Random Access Memory) and the like. In addition, the software programs used in Embodiments 1-3 are provided stored on a computer-readable recording medium 130. It should be noted that the software programs used in Embodiments 1-3 may be distributed over the Internet, which is connected via the communication interface 127.

Further, in addition to hard disks, semiconductor storage devices such as flash memory and the like are suggested as specific examples of the storage device 123. The input interface 124 mediates the transmission of data between the CPU 121 and an input device 128, such as a keyboard and a mouse. The display controller 125 is connected to a display device 129 and controls the display on the display device 129. The data reader/writer 126, which mediates the transmission of data between the CPU 121 and the recording medium 130, reads the software programs from the recording medium 130 and writes the processing results to the recording medium 130. The communication interface 127 mediates the transmission of data between the CPU 121 and other computers.

General-purpose semiconductor storage devices, such as CF (Compact Flash), SD (Secure Digital), and the like, as well as magnetic storage media, such as floppy disks (Flexible Disk) and the like, or optical storage media, such as CD-ROMs (Compact Disk Read Only Memory) and the like are suggested as specific examples of the recording medium 130.

Working Example 1

Next, a specific example of Embodiment 1 will be described as Working Example 1 with reference to FIG. 15. FIG. 15 is a diagram illustrating an example of the semantic class units identified in Working Example 1. In addition, a description of Working Example 1 will be provided with reference to the steps illustrated in FIG. 4 and FIG. 5.

(Step S1)

Upon external input of search terms, the body text retrieval unit 4 carries out a search process, and a query document list representing a set of tagged documents matching the search terms is created. It should be noted that the search process performed by the body text retrieval unit 4 is similar to the search process performed by regular search engines.

(Step S2)

It is assumed that the taxonomy illustrated in FIG. 6 is accepted as input by the search unit 2 and the inferior limit value α of the designated document collection frequencies a and the superior limit value β of the non-designated document collection frequencies b are both set to 0.5. The search unit 2 invokes the processing function dig(node, tax, 0.5, 0.5) and carries out Steps S11-S13 illustrated in FIG. 5. As a result, the search unit 2 creates the enumeration tree illustrated in FIG. 7 and identifies semantic class units based on the designated document collection frequencies a and the non-designated document collection frequencies b. Step S2 will be specifically described below.

The "node" accepted as input by the processing function dig at the start of the search is a null set (phi). At such time, the processing function dig(phi, tax, 0.5, 0.5) is invoked and, first of all, the search unit 2 adds Semantic Class W and Semantic Class V, which are located at the top of the taxonomy, as child nodes. In addition, this invokes the processing function dig(V, tax, 0.5, 0.5) and the processing function dig(W, tax, 0.5, 0.5).

Subsequently, when the processing function dig(V, tax, 0.5, 0.5) is invoked, first of all, the search unit 2 adds Semantic Class U and Semantic Class C, which are obtained by converting Semantic Class V to a child class, as child nodes. Furthermore, the search unit 2 uses Semantic Class W of the node to the right of Node V to create Semantic Class Unit VW, and uses it to add a child node VW.

While continuing the search in this manner, the search unit 2 directs the frequency calculation unit 3 to calculate the designated document collection frequencies a for the semantic class units of each node. If the calculated the designated document collection frequencies a are equal to or lower than the inferior limit value α (=0.5), the search unit 2 discontinues further search. For example, if the designated document collection frequency a of Node A is 0.3, the designated document collection frequencies a of the child nodes AB, AC, and AW created thereunder must be smaller than 0.3. For this reason, the search unit 2 discontinues the search upon calculating the designated document collection frequency a for Node A and can ignore the subordinate nodes AB, AC, and AW.

In addition, if the calculated the designated document collection frequencies a are larger than the inferior limit value α (=0.5), the search unit 2 directs the frequency calculation unit 3 to calculate the non-designated document collection frequencies b and makes an assessment as to whether the calculated the non-designated document collection frequencies b are lower than the superior limit value β. If an assessment is made that the non-designated document collection frequencies b are smaller than the superior limit value β, the search unit 2 outputs the semantic class units, the designated document collection frequencies a, and the non-designated document collection frequencies b of the nodes subject to calculation as groups of node information items (information sets) to the evaluation score calculation unit 5.

In this manner, in Step S2, the search unit 2 looks only for the semantic class units whose the designated document collection frequencies a are larger than the inferior limit value α while at the same time being able to retrieves semantic class units, whose the non-designated document collection frequencies b are smaller than the superior limit value β.

(Step S3)

The evaluation score calculation unit 5 accepts the information sets as input and calculates evaluation scores f using (Eq. 3) above. The evaluation score calculation unit 5 then identifies the semantic class units with the highest evaluation scores and outputs them to an external location.

Here, an example of the data outputted by the evaluation score calculation unit 5 will be described with reference to FIG. 15. The example of FIG. 15 involves outputting information sets made up of child nodes subject to calculation, semantic class units, the designated document collection frequencies a, and the non-designated document collection frequencies b. As shown in FIG. 15, each information set (each row) satisfies the condition a>α(0.5) and b<β(0.5).

Also, in Working Example 1, the evaluation score calculation unit 5 calculates an evaluation score f (=a/b) for each row and outputs the information set with the highest value. Specifically, when the child node is Node UE, the semantic class units (U, E) are output because the evaluation score is the maximum value "7 (=0.7/0.1)".

Working Example 2

Figure 16:
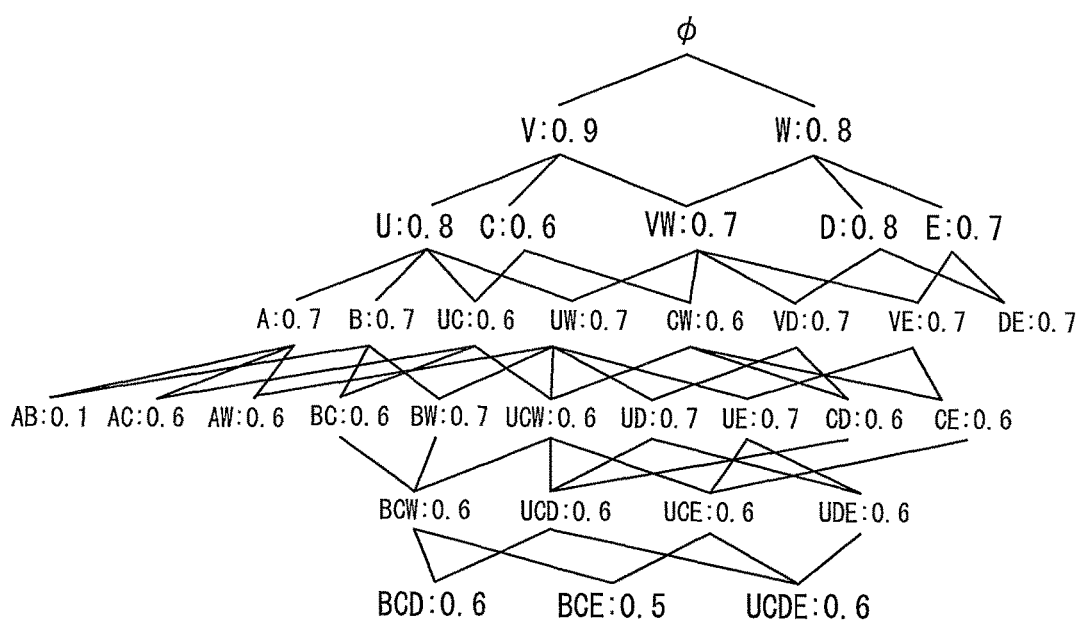
FIG. 16 is a diagram illustrating an exemplary enumeration tree outputted by the top-down search unit in Working Example 2.
Figure 17:
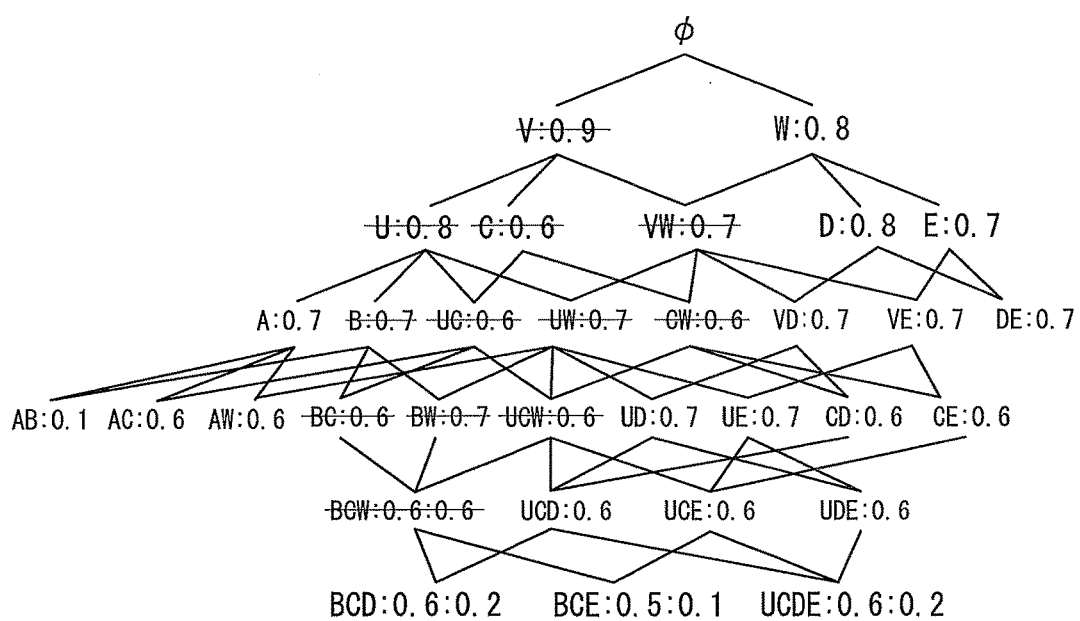
FIG. 17 is a diagram depicting an exemplary search process carried out by the bottom-up search unit in Working Example 2.

Next, a specific example of Embodiment 3 will be described as Working Example 2 with reference to FIG. 16 and FIG. 17. FIG. 16 is a diagram illustrating an exemplary enumeration tree outputted by the top-down search unit in Working Example 2. FIG. 17 is a diagram depicting an exemplary search process carried out by the bottom-up search unit in Working Example 2. In addition, a description of Working Example 2 will be provided with reference to the steps illustrated in FIG. 11, FIG. 12, and FIG. 14.

(Step S31)

Upon external input of search terms, the body text retrieval unit 4 carries out a search process, and a query document list representing a set of tagged documents matching the search terms is created. It should be noted that the search process performed by the body text retrieval unit 4 is similar to the search process performed by regular search engines.

(Step S32)

Assuming that the taxonomy illustrated in FIG. 6 has been supplied as the taxonomy to the top-down search unit 13 and the inferior limit value α of the designated document collection frequencies a has been set to 0.5, the top-down search unit 13 invokes the processing function top-down(node, tax, 0.5, 0) and carries out Steps S41-S45 illustrated in FIG. 12. As a result, the top-down search unit 13 creates the enumeration tree illustrated in FIG. 16, directs the designated document collection frequency calculation unit 17 to calculate the designated document collection frequencies a and, furthermore, performs a recompilation of the nodes of the enumeration tree. Step S32 will be specifically described below.

The "node" accepted as input by the processing function top-down at the start of the search is a null set (phi). At such time, the processing function top-down(phi, tax, 0.5, 0) is invoked and, first of all, the top-down search unit 13 adds Semantic Class W and Semantic Class V, which are located at the top of the taxonomy, as child nodes. In addition, this invokes the processing function top-down(V, tax, 0.5, 1) and the processing function top-down(W, tax, 0.5, 1).

Subsequently, when the processing function top-down(V, tax, 0.5, 1) is invoked, first of all, the top-down search unit 13 adds Semantic Class U and Semantic Class C, which are obtained by converting Semantic Class V to a child class, as child nodes. Furthermore, the top-down search unit 13 uses the semantic class of the node to the right of Node V to create Semantic Class Unit VW, and uses it to add a child node VW.

Next, in accordance with the processing function top-down, the top-down search unit 13 adds links indicating parent-child relationships that can be logically inferred by analogy between the child nodes (node.children) created in the foregoing process and the nodes located thereabove. Specifically, assuming that the node that has been accepted as input is Node V, the top-down search unit 13 performs a comparison between its brother node W and its child nodes U, C, and VW. As a result, a link is added between Node W and Node VW.

Next, the top-down search unit 13 directs the designated document collection frequency calculation unit 17 to perform the calculation of the designated document collection frequencies a for the added child nodes and makes an assessment as to whether the calculated the designated document collection frequencies a are larger than the inferior limit value $\alpha$. For example, the processing function top-down(U, tax, 0.5, 2), processing function top-down(C, tax, 0.5, 2) and processing function top-down(VW, tax, 0.5, 2) are invoked if the child nodes subject to calculation are child nodes U, C, and VW and all of them have the designated document collection frequencies a larger than the inferior limit value $\alpha$. On the other hand, if the designated document collection frequencies a are equal to or lower than the inferior limit value $\alpha$, the search unit 13 deletes the child nodes subject to assessment from the enumeration tree.

While continuing the search in this manner, the top-down search unit 13 calculates the designated document collection frequencies a for the semantic class units and outputs the data of the enumeration tree illustrated in FIG. 16 to the bottom-up search unit 14.

(Step S33)

Next, the bottom-up search unit 14 accepts as input the nodes of the enumeration tree illustrated in FIG. 16 and invokes the processing function bottom-up(node, 0.5), carrying out the calculation and assessment of the non-designated document collection frequencies b. The results of the processing performed by the bottom-up search unit 14 will be, for example, as shown in FIG. 17.

Specifically, the bottom-up search unit 14 performs processing from nodes located in the lowest positions in FIG. 16 towards nodes located in higher positions and directs the non-designated document collection frequency calculation unit 18 to perform the calculation of the non-designated document collection frequencies b for each node. In addition, the bottom-up search unit 14 makes an assessment as to whether the non-designated document collection frequencies b are smaller than the superior limit value $\beta$.

If an assessment is made that the non-designated document collection frequencies b are equal to or higher than 0.5, the bottom-up search unit 14 deletes the nodes subject to assessment and their ancestor nodes from the enumeration tree. For example, suppose the non-designated document collection frequency b of Node BCW is found to be 0.6. At such time, as shown in FIG. 17, the bottom-up search unit 14 deletes Node BCW and all its ancestor nodes. This is due to the fact that if the frequency of Node BCW is equal to or higher than 0.5, the frequency of all its ancestor nodes must be equal to or higher than 0.5. In Working Example 2, the bottom-up search unit 14 can efficiently calculate the non-designated document collection frequencies b because the non-designated document collection frequencies b are checked in accordance with this type of procedure.

After that the bottom-up search unit 14 outputs the semantic class units of the nodes that have not been deleted from the enumeration tree, as well as the corresponding the designated document collection frequencies a and the non-designated document collection frequencies b as information sets.

(Step S34)

The evaluation score calculation unit 5 accepts the information sets as input and calculates evaluation scores f using (Eq. 3) above. The evaluation score calculation unit 5 then identifies the semantic class units with the highest evaluation scores and outputs them to an external location. The processing performed by the evaluation score calculation unit 5 is similar to Working Example 1 (see FIG. 15).

In addition, while some or all of the above-described embodiments and working examples can be represented in the form of the following (Supplementary Note 1)-(Supplementary Note 24), they are not limited to the descriptions below.

(Supplementary Note 1)

An information processing device for document collections having tags permitting semantic class identification appended to each document, comprising:

a search unit that creates a plurality of semantic class units containing one, two, or more semantic classes based on a taxonomy that identifies relationships between semantic classes among a plurality of semantic classes; and a frequency calculation unit that for each of the semantic class units, identifies documents that match that semantic class unit in the document collections and, for the identified matching documents, calculates a first frequency that represents the frequency of occurrence in a designated document collection among the document collections and a second frequency that represents the frequency of occurrence in non-designated document collections among the document collections, wherein once the calculations have been performed by the frequency calculation unit, the search unit identifies any of the semantic class units based on the first frequency and the second frequency of the matching documents.

(Supplementary Note 2)

The information processing device according to Supplementary Note 1, wherein the search unit identifies the semantic class units, for which the first frequency of the matching documents is higher than a first threshold value and, at the same time, the second frequency of the matching documents is lower than a second threshold value.

(Supplementary Note 3)

The information processing device according to Supplementary Note 1 or 2, wherein:

the information processing device further comprises a retrieval unit that carries out search in the document collections based on externally entered search terms, and the frequency calculation unit calculates the first frequency and the second frequency using a document collection identified by a search as the designated document collection.

(Supplementary Note 4)

The information processing device according to any of Supplementary Notes 1-3, wherein:

the tags contain identifiers indicating the semantic classes corresponding thereto;

the search unit identifies, for each of the semantic class units, a set of identifiers corresponding to said semantic class unit; and the frequency calculation unit identifies documents matching the semantic class units by comparing the set of the identified identifiers and the tags appended to each document in the document collections.

(Supplementary Note 5)

The information processing device according to any of Supplementary Notes 1-4, further comprising an evaluation score calculation unit that calculates, for the semantic class units identified by the search unit, evaluation scores whose value increases either when the first frequency of the matching documents increases or when the second frequency decreases, or in both cases, and that identifies the semantic class units with the highest evaluation scores.

(Supplementary Note 6)

The information processing device according to any of Supplementary Notes 1-5, wherein:

the taxonomy identifies relationships between semantic classes among a plurality of semantic classes in a hierarchical manner; and as the search unit traverses the taxonomy from the top level to the bottom level, it creates an enumeration tree by designating one, two or more of the semantic classes as nodes and establishing links between the nodes, and designates the nodes of the enumeration tree as the semantic class units.

(Supplementary Note 7)

The information processing device according to Supplementary Note 2, wherein:

the taxonomy identifies relationships between semantic classes among a plurality of semantic classes in a hierarchical manner;

the search unit, as it traverses the taxonomy from the top level to the bottom level, creates an enumeration tree by designating one, two or more of the semantic classes as nodes and establishing links between the nodes, and designates the nodes of the enumeration tree as the semantic class units;

the frequency calculation unit calculates the first frequency and the second frequency for each of the semantic class units in the descending order of the level of the nodes of said semantic class units in the enumeration tree; and furthermore, whenever the frequency calculation unit performs calculations, the search unit makes an assessment as to whether the first frequency is higher than the first threshold value and whether the second frequency is lower than the second threshold value, thereby performing the identification of the semantic class units; and the calculations and assessment performed by the frequency calculation unit for nodes located further below the nodes of the semantic class units subject to calculation are discontinued when the first frequency is equal to or lower than the first threshold value.

(Supplementary Note 8)

The information processing device according to Supplementary Note 2, wherein:

the taxonomy identifies relationships between semantic classes among a plurality of semantic classes in a hierarchical manner;

the search unit, as it traverses the taxonomy from the top level to the bottom level, creates an enumeration tree by designating one, two or more of the semantic classes as nodes and establishing links between the nodes, and designates the nodes of the enumeration tree as the semantic class units;

the frequency calculation unit, in response to instructions from the search unit, calculates, for each of the semantic class units, the first frequency in the descending order of the level of the nodes of said semantic class units in the enumeration tree and, furthermore, calculates the second frequency in the ascending order of the level of the nodes of said semantic class units in the enumeration tree; and in addition, if the semantic classes of a certain node in the enumeration tree are contained in the semantic classes of a non-parent node located above said node, the search unit establishes a new link between said node and the non-parent node located thereabove; and whenever the first frequency is calculated by the frequency calculation unit, makes an assessment as to whether the first frequency is higher than the first threshold value and, if the first frequency is equal to or lower than the first threshold value, designates the semantic class units subject to calculation as items to be excluded and deletes the nodes of the semantic class units subject to exclusion from the enumeration tree;

directs the frequency calculation unit to calculate the second frequency for a plurality of semantic class units obtained by excluding the items to be excluded and, whenever the frequency calculation unit performs calculations, makes an assessment as to whether the second frequency is lower than the second threshold value; and if the second frequency is equal to or higher than the second threshold value, deletes the nodes of the semantic class units subject to calculation and all the superordinate nodes directly and indirectly coupled to said nodes from the enumeration tree; and after that, identifies the semantic class units obtained from the nodes remaining in the enumeration tree.

(Supplementary Note 9)

An information processing method for processing document collections having tags permitting semantic class identification appended to each document, comprising the steps of:

(a) creating multiple semantic class units containing one, two, or more semantic classes based on a taxonomy that identifies relationships between semantic classes among a plurality of semantic classes;

(b) for each of the semantic class units, identifying documents matching that semantic class unit in the document collections;

(c) for the matching documents identified in Step (b), calculating, for each of the semantic class units, a first frequency that represents the frequency of occurrence in a designated document collection among the document collections and a second frequency that represents the frequency of occurrence in non-designated document collections among the document collections; and (d) once the calculations of Step (c) above have been performed, identifying any of the semantic class units based on the first frequency and the second frequency of the matching documents identified in Step (b) above.

(Supplementary Note 10)

The information processing method according to Supplementary Note 9, wherein Step (d) above involves identifying the semantic class units, for which the first frequency of the matching documents identified in Step (b) above is higher than the first threshold value and, at the same time, the second frequency of the matching documents is lower than the second threshold value.

(Supplementary Note 11)

The information processing method according to Supplementary Note 9 or Supplementary Note 10, further comprising the step of:

(e) performing a search in the document collections based on externally entered search terms, and in which, wherein in Step (b) above, the first frequency and the second frequency are calculated by using the document collection identified by the search in Step (e) above as the designated document collection.

(Supplementary Note 12)

The information processing method according to any of Supplementary Notes 9-11, wherein:

the tags contain identifiers indicating the semantic classes corresponding thereto;

Step (a) above further involves identifying, for each of the semantic class units, a set of identifiers corresponding to said semantic class unit, and Step (b) above involves identifying documents matching the semantic class units by comparing the set of the identified identifiers and the tags appended to each document in the document collections.

(Supplementary Note 13)

The information processing method according to any of Supplementary Notes 9-12, further comprising the step of (f) calculating, for the semantic class units identified in Step (d) above, evaluation scores whose value increases either when the first frequency of the matching documents increases or when the second frequency decreases, or in both cases, and identifying the semantic class units with the highest evaluation scores.

(Supplementary Note 14)

The information processing method according to any of Supplementary Notes 9-13, wherein:

the taxonomy identifies relationships between semantic classes among a plurality of semantic classes in a hierarchical manner; and in Step (a) above, as the taxonomy is traversed from the top level to the bottom level, an enumeration tree is created by designating one, two or more of the semantic classes as nodes and establishing links between the nodes, and the nodes of the enumeration tree are designated as the semantic class units.

(Supplementary Note 15)

The information processing method according to Supplementary Note 10, wherein:

the taxonomy identifies relationships between semantic classes among a plurality of semantic classes in a hierarchical manner;

in Step (a) above, as the taxonomy is traversed from the top level to the bottom level, an enumeration tree is created by designating one, two or more of the semantic classes as nodes and establishing links between the nodes, and the nodes of the enumeration tree are designated as the semantic class units;

in Step (c) above, the first frequency and the second frequency are calculated for each of the semantic class units in the descending order of the level of the nodes of said semantic class units in the enumeration tree;

in Step (d) above, whenever the calculations of Step (c) above are performed, an assessment is made as to whether the first frequency is higher than the first threshold value and whether the second frequency is lower than the second threshold value, thereby performing the identification of the semantic class units; and the execution of Step (c) above and Step (d) above for nodes located further below the nodes of the semantic class units subject to calculation are discontinued if during Step (d) above the first frequency is assessed to be equal to or lower than the first threshold value.

(Supplementary Note 16)

The information processing method according to Supplementary Note 10, wherein:

the taxonomy identifies relationships between semantic classes among a plurality of semantic classes in a hierarchical manner;

in Step (a) above, as the taxonomy is traversed from the top level to the bottom level, an enumeration tree is created by designating one, two or more of the semantic classes as nodes and establishing links between the nodes, and the nodes of the enumeration tree are designated as the semantic class units;

in Step (c) above, for each of the semantic class units, only the first frequency is calculated in the descending order of the level of the nodes of said semantic class units in the enumeration tree, and Step (d) above includes the steps of:

(d1) if the semantic classes of a certain node in the enumeration tree are contained in the semantic classes of a non-parent node located above said node, establishing a new link between said node and the non-parent node located thereabove; and (d2) whenever the first frequency is calculated in Step (c) above, making an assessment as to whether the first frequency is higher than the first threshold value;

(d3) if as a result of the assessment made in Step (d2) above it is determined that the first frequency is equal to or lower than the first threshold value, designating the semantic class units subject to calculation in Step (d2) above as items to be excluded and deleting the nodes of the semantic class units subject to exclusion from the enumeration tree;

(d4) calculating the second frequency for a plurality of semantic class units obtained by excluding the items to be excluded, for each of the semantic class units, in the ascending order of the level of the nodes of said semantic class units in the enumeration tree;

(d5) whenever the second frequency is calculated in Step (d4), making an assessment as to whether the second frequency is lower than the second threshold value;

(d6) if as a result of the assessment made in Step (d5) above it is determined that the second frequency is equal to or higher than the second threshold value, deleting the nodes of the semantic class units subject to calculation and all the superordinate nodes directly and indirectly coupled to said nodes from the enumeration tree; and (d7) identifying the semantic class units obtained from the nodes remaining in the enumeration tree.

(Supplementary Note 17)

A computer-readable recording medium having recorded thereon a software program used to carry out information processing on document collections having tags permitting semantic class identification appended to each document, the software program comprising instructions directing a computer to carry out the steps of:

(a) creating a plurality of semantic class units containing one, two, or more semantic classes based on a taxonomy that identifies relationships between semantic classes among a plurality of semantic classes;

(b) for each of the semantic class units, identifying documents matching that semantic class unit in the document collections;

(c) for the matching documents identified in Step (b), calculating, for each of the semantic class units, a first frequency that represents the frequency of occurrence in a designated document collection among the document collections and a second frequency that represents the frequency of occurrence in non-designated document collections among the document collections; and (d) once the calculations of Step (c) above have been performed, identifying any of the semantic class units based on the first frequency and the second frequency of the matching documents identified in Step (b) above.

(Supplementary Note 18)

The computer-readable recording medium according to Supplementary Note 17, wherein Step (d) above involves identifying the semantic class units, for which the first frequency of the matching documents identified in Step (b) above is higher than the first threshold value and, at the same time, the second frequency of the matching documents is lower than the second threshold value.

(Supplementary Note 19)

The computer-readable recording medium according to Supplementary Note 17 or 18, which further directs the computer to carry out the step of:

(e) performing a search in the document collections based on externally entered search terms, and, in Step (b) above, calculating the first frequency and the second frequency by using the document collection identified by the search in Step (e) above as the designated document collection.

(Supplementary Note 20)

The computer-readable recording medium according to any of Supplementary Notes 17-19, wherein:

the tags contain identifiers indicating the semantic classes corresponding thereto;

Step (a) above further involves identifying, for each of the semantic class units, a set of identifiers corresponding to said semantic class unit, and Step (b) above involves identifying documents matching the semantic class units by comparing the set of the identified identifiers and the tags appended to each document in the document collections.

(Supplementary Note 21)

The computer-readable recording medium according to any of Supplementary Notes 17-20, which further directs the computer to carry out the step of (f) calculating, for the semantic class units identified in Step (d) above, evaluation scores whose value increases either when the first frequency of the matching documents increases or when the second frequency decreases, or in both cases, and identifying the semantic class units with the highest evaluation scores.

(Supplementary Note 22)

The computer-readable recording medium according to any of Supplementary Notes 17-21, wherein:

the taxonomy identifies relationships between semantic classes among a plurality of semantic classes in a hierarchical manner; and in Step (a) above, as the taxonomy is traversed from the top level to the bottom level, an enumeration tree is created by designating one, two or more of the semantic classes as nodes and establishing links between the nodes, and the nodes of the enumeration tree are designated as the semantic class units.

(Supplementary Note 23)

The computer-readable recording medium according to Supplementary Note 18, wherein:

the taxonomy identifies relationships between semantic classes among a plurality of semantic classes in a hierarchical manner;

in Step (a) above, as the taxonomy is traversed from the top level to the bottom level, an enumeration tree is created by designating one, two or more of the semantic classes as nodes and establishing links between the nodes, and the nodes of the enumeration tree are designated as the semantic class units;

in Step (c) above, the first frequency and the second frequency are calculated for each of the semantic class units in the descending order of the level of the nodes of said semantic class units in the enumeration tree;

in Step (d) above, whenever the calculations of Step (c) above are performed, an assessment is made as to whether the first frequency is higher than the first threshold value and whether the second frequency is lower than the second threshold value, thereby performing the identification of the semantic class units; and the execution of Step (c) above and Step (d) above for nodes located further below the nodes of the semantic class units subject to calculation are discontinued if during Step (d) above the first frequency is assessed to be equal to or lower than the first threshold value.

(Supplementary Note 24)

The computer-readable recording medium according to Supplementary Note 18, wherein:

the taxonomy identifies relationships between semantic classes among a plurality of semantic classes in a hierarchical manner;

in Step (a) above, as the taxonomy is traversed from the top level to the bottom level, an enumeration tree is created by designating one, two or more of the semantic classes as nodes and establishing links between the nodes, and the nodes of the enumeration tree are designated as the semantic class units;

in Step (c) above, for each of the semantic class units, only the first frequency is calculated in the descending order of the level of the nodes of said semantic class units in the enumeration tree, and Step (d) above includes the steps of:

(d1) if the semantic classes of a certain node in the enumeration tree are contained in the semantic classes of a non-parent node located above said node, establishing a new link between said node and the non-parent node located thereabove; and (d2) whenever the first frequency is calculated in Step (c) above, making an assessment as to whether the first frequency is higher than the first threshold value;

(d3) if as a result of the assessment made in Step (d2) above it is determined that the first frequency is equal to or lower than the first threshold value, designating the semantic class units subject to calculation in Step (d2) above as items to be excluded and deleting the nodes of the semantic class units subject to exclusion from the enumeration tree;

(d4) calculating the second frequency for a plurality of semantic class units obtained by excluding the items to be excluded, for each of the semantic class units, in the ascending order of the level of the nodes of said semantic class units in the enumeration tree;

(d5) whenever the second frequency is calculated in Step (d4), making an assessment as to whether the second frequency is lower than the second threshold value;

(d6) if as a result of the assessment made in Step (d5) above it is determined that the second frequency is equal to or higher than the second threshold value, deleting the nodes of the semantic class units subject to calculation and all the superordinate nodes directly and indirectly coupled to said nodes from the enumeration tree; and (d7) identifying the semantic class units obtained from the nodes remaining in the enumeration tree.

While the invention of the present application has been described above with reference to embodiments and working examples, the invention of the present application is not limited to the above-described embodiments and working examples. Various changes in the form and details of the invention of the present application, which can be appreciated by those of ordinary skill in the art, can be made within the scope of the invention of the present application.

This application claims the benefits of Japanese Patent Application 2010-007339 filed on Jan. 15, 2010, the disclosure of which is incorporated herein in its entirely by reference.

INDUSTRIAL APPLICABILITY

The present invention is applicable, for example, to text retrieval and summarization systems that hold tagged documents and taxonomies and are used to summarize document collections made up of tagged documents retrieved by users. In such a case, a user search query permits retrieval of semantic class units, i.e., one, two, or more semantic classes that represent a point of view summarizing the search results.

DESCRIPTIONS OF REFERENCE NUMERALS

1 Information processing device
2 Search unit
3 Frequency calculation unit
4 Body text retrieval unit
5 Evaluation score calculation unit
6 Tag retrieval unit
7 Body text storage unit
8 Tag storage unit
11 Information processing device
12 Search unit
13 Top-down search unit
14 Bottom-up search unit
15 Frequency calculation unit
16 Tag retrieval unit
17 The designated document collection frequency calculation unit
18 The non-designated document collection frequency calculation unit
120 Computer
121 CPU
122 Main memory
123 Storage device
124 Input interface
125 Display controller
126 Data reader/writer
127 Communication interface
128 Input device
129 Display device
130 Recording medium
131 Bus

The invention claimed is:

1. An information processing device comprising a Central Processing Unit (CPU) for document collections having tags permitting semantic class identification appended to each document, the information processing device comprising:
a search unit of the CPU that creates a plurality of semantic class units containing two, or more semantic classes based on a taxonomy that identifies relationships between semantic classes among a plurality of semantic classes, such that there is no semantic class in a semantic class unit which is an ancestor or a descendant of any other semantic class in the same semantic class unit;
a frequency calculation unit of the CPU that, for each of the semantic class units, identifies documents that match that semantic class unit in the document collections, and the frequency calculation unit calculates a first frequency and a second frequency, the first frequency representing occurrence of the semantic class units in a first subset of documents of the document collections, and the second frequency representing occurrence of the semantic class units in a second subset of documents of the document collections; and
a retrieval unit of the CPU that carries out a search in the document collections based on externally entered search terms, and separates the document collections into the first subset by determining that documents of the first subset comprise the search terms and into the second subset by determining that documents of the second subset do not comprise the search terms, wherein:
the search unit is configured to identify the semantic class units and output the semantic class units to an enumeration tree in response to determining that the first frequency is higher than a first threshold value and that the second frequency is lower than a second threshold value;
the taxonomy identifies relationships between semantic classes among the plurality of semantic classes in a hierarchical manner; and
as the search unit carries out a child class conversion process and a class addition process in the enumeration tree whose root is a null set, the search unit creates the enumeration tree by designating one, two or more of the semantic classes as nodes and establishing links between the nodes, and extracts a combination of semantic classes in which the semantic classes are not an ancestor or a descendant of each other to create the semantic class units.

2. The information processing device according to claim 1, wherein:
the tags contain identifiers indicating the semantic classes corresponding thereto;
the search unit is further configured to identify, for each of the semantic class units, a set of identifiers corresponding to said semantic class unit; and
the frequency calculation unit is further configured to identify documents matching the semantic class units by comparing the set of the identified identifiers and the tags appended to each document in the document collections.

3. The information processing device according to claim 1, further comprising an evaluation score calculation unit of the CPU configured to calculate, for the semantic class units identified by the search unit, evaluation scores whose value increases either when the first frequency increases or when the second frequency decreases, or in both cases, and to identify the semantic class unit with the highest evaluation scores.

4. The information processing device according to claim 1, wherein:
as the search unit traverses the taxonomy from a top level to a bottom level, the search unit designates the nodes of the enumeration tree as the semantic class units.

5. The information processing device according to claim 1, wherein:
  the search unit, as it traverses the taxonomy from a top level to a bottom level, creates the enumeration tree by designating one, two or more of the semantic classes as nodes and establishing links between the nodes, and designates the nodes of the enumeration tree as the semantic class units;
  the frequency calculation unit is further configured to calculate the first frequency and the second frequency for each of the semantic class units in the descending order of the level of the nodes of said semantic class unit in the enumeration tree; and
  furthermore, in response to the frequency calculation unit performing calculations, the search unit makes an assessment as to whether the first frequency is higher than the first threshold value and whether the second frequency is lower than the second threshold value, thereby performing the identification of the semantic class units; and
  the calculations and assessment performed by the frequency calculation unit for nodes located further below the nodes of the semantic class unit subject to calculation are discontinued when the first frequency is equal to or lower than the first threshold value.

6. The information processing device according to claim 1, wherein:
  the search unit, as it traverses the taxonomy from a top level to a bottom level, creates the enumeration tree by designating one, two or more of the semantic classes as nodes and establishing links between the nodes, and designates the nodes of the enumeration tree as the semantic class units;
  the frequency calculation unit, in response to instructions from the search unit, calculates, for each of the semantic class units, the first frequency in the descending order of the level of the nodes of said semantic class unit in the enumeration tree and, furthermore, calculates the second frequency in the ascending order of the level of the nodes of said semantic class unit in the enumeration tree; and
  in addition,
  if the semantic classes of a certain node in the enumeration tree are contained in the semantic classes of a non-parent node located above said node, the search unit establishes a new link between said node and the non-parent node located thereabove; and
  in response to the first frequency being calculated by the frequency calculation unit, makes an assessment as to whether the first frequency is higher than the first threshold value and, if the first frequency is equal to or lower than the first threshold value, designates the semantic class units subject to calculation as items to be excluded and deletes the nodes of the semantic class units subject to exclusion from the enumeration tree;
  directs the frequency calculation unit to calculate the second frequency for a plurality of semantic class units obtained by excluding the items to be excluded and, in response to calculating the first frequency and the second frequency, makes an assessment as to whether the second frequency is lower than the second threshold value; and
  if the second frequency is equal to or higher than the second threshold value, deletes the nodes of the semantic class units subject to calculation and all the superordinate nodes directly and indirectly coupled to said nodes from the enumeration tree; and
  after that, identifies the semantic class units obtained from the nodes remaining in the enumeration tree.

7. The information processing device according to claim 1, wherein the search unit further carries out the child class conversion process and the class addition process by adding an addition child node to a first branch of the enumeration tree by combining a second node from a second branch of the enumeration tree with a first node of the first branch,
  the addition child node is child to the first node, and
  a closest connection between the first branch and second branch is through traversing the enumeration tree at least to the null set.

8. An information processing method for processing document collections having tags permitting semantic class identification appended to each document, comprising:
  creating multiple semantic class units containing two or more semantic classes based on a taxonomy that identifies relationships between semantic classes among a plurality of semantic classes, such that there is no semantic class in a semantic class unit which is an ancestor or a descendant of any other semantic class in the same semantic class unit;
  identifying, for each of the semantic class units, documents that match that semantic class unit in the document collections, and calculating a first frequency and a second frequency, the first frequency representing occurrence of the semantic class units in a first subset of documents of the document collections, and the second frequency representing occurrence of the semantic class units in a second subset of documents of the document collections; and
  searching in the document collections based on externally entered search terms, and separating the document collections into the first subset by determining that documents of the first subset comprise the search terms and into the second subset by determining that documents of the second subset do not comprise the search terms; and
  identifying the semantic class units and output the semantic class units to an enumeration tree in response to determining that the first frequency is higher than a first threshold value and that the second frequency is lower than a second threshold value, wherein
  the taxonomy identifies relationships between semantic classes among the plurality of semantic classes in a hierarchical manner, and
  wherein the method further comprises carrying out a child class conversion process and a class addition process in the enumeration tree whose root is a null set, and creating the enumeration tree by designating one, two or more of the semantic classes as nodes and establishing links between the nodes, and extracting a combination of semantic classes in which the semantic classes are not an ancestor or a descendant of each other to create the semantic class units.

9. The information processing method according to claim 8, wherein:
  the tags contain identifiers indicating the semantic classes corresponding thereto;
  the method further comprises:
    identifying, for each of the semantic class units, a set of identifiers corresponding to said semantic class unit, and
  identifying documents matching the semantic class units by comparing the set of the identified identifiers and the tags appended to each document in the document collections.

10. The information processing method according to claim 8, further comprising: calculating, for the semantic class units, evaluation scores whose value increases either when the first frequency increases or when the second frequency decreases, or in both cases, and identifying the semantic class units with the highest evaluation scores.

11. The information processing method according to claim 8, wherein:
as the taxonomy is traversed from a top level to a bottom level, the enumeration tree is created by designating one, two or more of the semantic classes as nodes and establishing links between the nodes, and the nodes of the enumeration tree are designated as the semantic class units.

12. The information processing method according to claim 8, wherein:
as the taxonomy is traversed from a top level to a bottom level, an enumeration tree is created by designating one, two or more of the semantic classes as nodes and establishing links between the nodes, and the nodes of the enumeration tree are designated as the semantic class units;
the first frequency and the second frequency are calculated for each of the semantic class units in the descending order of the level of the nodes of said semantic class units in the enumeration tree;
in response to calculating the first frequency and the second frequency, an assessment is made as to whether the first frequency is higher than the first threshold value and whether the second frequency is lower than the second threshold value, thereby performing the identification of the semantic class units; and
the execution of calculating the first frequency and the second frequency for nodes located further below the nodes of the semantic class units subject to calculation are discontinued if during the assessment the first frequency is assessed to be equal to or lower than the first threshold value.

13. The information processing method according to claim 8, wherein:
as the taxonomy is traversed from a top level to a bottom level, an enumeration tree is created by designating one, two or more of the semantic classes as nodes and establishing links between the nodes, and the nodes of the enumeration tree are designated as the semantic class units;
for each of the semantic class units, only the first frequency is calculated in the descending order of the level of the nodes of said semantic class units in the enumeration tree, and
identifying the semantic class units further comprises:
(d1) if the semantic classes of a certain node in the enumeration tree are contained in the semantic classes of a non-parent node located above said node, establishing a new link between said node and the non-parent node located thereabove; and
(d2) in response to the first frequency being calculated, making an assessment as to whether the first frequency is higher than the first threshold value;
(d3) if as a result of the assessment made in (d2) it is determined that the first frequency is equal to or lower than the first threshold value, designating the semantic class units subject to calculation in (d2) as items to be excluded and deleting the nodes of the semantic class units subject to exclusion from the enumeration tree;
(d4) calculating the second frequency for a plurality of semantic class units obtained by excluding the items to be excluded, for each of the semantic class units, in the ascending order of the level of the nodes of said semantic class units in the enumeration tree;
(d5) in response to the second frequency being calculated in (d4), making an assessment as to whether the second frequency is lower than the second threshold value;
(d6) if as a result of the assessment made in (d5) it is determined that the second frequency is equal to or higher than the second threshold value, deleting the nodes of the semantic class units subject to calculation and all the superordinate nodes directly and indirectly coupled to said nodes from the enumeration tree; and
(d7) identifying the semantic class units obtained from the nodes remaining in the enumeration tree.

14. A non-transitory computer-readable recording medium having recorded thereon a software program used to carry out information processing on document collections having tags permitting semantic class identification appended to each document, the software program comprising instructions directing a computer to carry out a method comprising:
creating a plurality of semantic class units containing two or more semantic classes based on a taxonomy that identifies relationships between semantic classes among a plurality of semantic classes, such that there is no semantic class in a semantic class unit which is an ancestor or a descendant of any other semantic class in the same semantic class unit;
identifying, for each of the semantic class units, documents that match that semantic class unit in the document collections, and calculating a first frequency and a second frequency, the first frequency representing occurrence of the semantic class units in a first subset of documents of the document collections, and the second frequency representing occurrence of the semantic class units in a second subset of documents of the document collections; and
searching in the document collections based on externally entered search terms, and separating the document collections into the first subset by determining that documents of the first subset comprise the search terms and into the second subset by determining that documents of the second subset do not comprise the search terms; and
identifying the semantic class units and output the semantic class units to an enumeration tree in response to determining that the first frequency is higher than a first threshold value and that the second frequency is lower than a second threshold value, wherein
the taxonomy identifies relationships between semantic classes among the plurality of semantic classes in a hierarchical manner, and
wherein the method further comprises carrying out a child class conversion process and a class addition process in the enumeration tree whose root is a null set, the search unit creates an enumeration tree by designating one, two or more of the semantic classes as nodes and establishing links between the nodes, and extracts a combination of semantic classes in which the semantic classes are not an ancestor or a descendant of each other to create the semantic class units.

15. The non-transitory computer-readable recording medium according to claim 14, wherein:
the tags contain identifiers indicating the semantic classes corresponding thereto; and the method further comprises identifying, for each of the semantic class units, a set of identifiers corresponding to said semantic class unit, and identifying documents matching the semantic class units by comparing the set of the identified identifiers and the tags appended to each document in the document collections.

16. The non-transitory computer-readable recording medium according to claim 14, which further directs the computer to carry out: calculating, for the semantic class units, evaluation scores whose value increases either when the first frequency increases or when the second frequency decreases, or in both cases, and identifying the semantic class units with the highest evaluation scores.

17. The non-transitory computer-readable recording medium according to claim 14, wherein:

as the taxonomy is traversed from a top level to a bottom level, the enumeration tree is created by designating one, two or more of the semantic classes as nodes and establishing links between the nodes, and the nodes of the enumeration tree are designated as the semantic class units.

18. The non-transitory computer-readable recording medium according to claim 14, wherein:

the taxonomy identifies relationships between semantic classes among a plurality of semantic classes in a hierarchical manner;

as the taxonomy is traversed from a top level to a bottom level, the enumeration tree is created by designating one, two or more of the semantic classes as nodes and establishing links between the nodes, and the nodes of the enumeration tree are designated as the semantic class units;

the first frequency and the second frequency are calculated for each of the semantic class units in the descending order of the level of the nodes of said semantic class units in the enumeration tree;

in response to calculating the first frequency and the second frequency, an assessment is made as to whether the first frequency is higher than the first threshold value and whether the second frequency is lower than the second threshold value, thereby performing the identification of the semantic class units; and the execution of calculating the first frequency and the second frequency for nodes located further below the nodes of the semantic class units subject to calculation are discontinued if during the assessment the first frequency is assessed to be equal to or lower than the first threshold value.

19. The non-transitory computer-readable recording medium according to claim 14, wherein:

as the taxonomy is traversed from a top level to a bottom level, the enumeration tree is created by designating one, two or more of the semantic classes as nodes and establishing links between the nodes, and the nodes of the enumeration tree are designated as the semantic class units;

for each of the semantic class units, only the first frequency is calculated in the descending order of the level of the nodes of said semantic class units in the enumeration tree, and the method further comprises:

(d1) if the semantic classes of a certain node in the enumeration tree are contained in the semantic classes of a non-parent node located above said node, establishing a new link between said node and the non-parent node located thereabove; and (d2) in response to the first frequency being calculated, making an assessment as to whether the first frequency is higher than the first threshold value;

(d3) if as a result of the assessment made in (d2) it is determined that the first frequency is equal to or lower than the first threshold value, designating the semantic class units subject to calculation in (d2) as items to be excluded and deleting the nodes of the semantic class units subject to exclusion from the enumeration tree;

(d4) calculating the second frequency for a plurality of semantic class units obtained by excluding the items to be excluded, for each of the semantic class units, in the ascending order of the level of the nodes of said semantic class units in the enumeration tree;

(d5) in response to the second frequency being calculated in (d4), making an assessment as to whether the second frequency is lower than the second threshold value;

(d6) if as a result of the assessment made in (d5) it is determined that the second frequency is equal to or higher than the second threshold value, deleting the nodes of the semantic class units subject to calculation and all the superordinate nodes directly and indirectly coupled to said nodes from the enumeration tree; and (d7) identifying the semantic class units obtained from the nodes remaining in the enumeration tree.

* * * * *

UNITED STATES PATENT AND TRADEMARK OFFICE
CERTIFICATE OF CORRECTION

PATENT NO. : 9,824,142 B2
APPLICATION NO. : 13/522278
DATED : November 21, 2017
INVENTOR(S) : Yukitaka Kusumura, Hironori Mizuguchi and Dai Kusui Page 1 of 1

It is certified that error appears in the above-identified patent and that said Letters Patent is hereby corrected as shown below:

In the Specification

Column 18, Description of Embodiments, Line 37; "$\alpha$" has been replaced with --$\beta$-- therefor Column 28, Description of Embodiments, Line 19; "a>$\alpha$(0.5) and b<$\beta$(0.5)." has been replaced with --a>$\alpha$(=0.5) and b<$\beta$(=0.5).-- therefor Signed and Sealed this
Eighteenth Day of June, 2019

Andrei Iancu
*Director of the United States Patent and Trademark Office*